(12) United States Patent
Hashimoto et al.

(10) Patent No.: US 10,343,686 B2
(45) Date of Patent: Jul. 9, 2019

(54) AUTONOMOUS DRIVING SYSTEM

(71) Applicant: Toyota Jidosha Kabushiki Kaisha, Toyota-shi, Aichi-ken (JP)

(72) Inventors: Ryuta Hashimoto, Susono (JP); Yoshinori Watanabe, Gotenba (JP); Kenichiro Aoki, Miyoshi (JP); Tomoyuki Kuriyama, Hadano (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 48 days.

(21) Appl. No.: 15/667,055

(22) Filed: Aug. 2, 2017

(65) Prior Publication Data

US 2018/0043897 A1 Feb. 15, 2018

(30) Foreign Application Priority Data

Aug. 10, 2016 (JP) .................................. 2016-157601

(51) Int. Cl.
*G05D 1/02* (2006.01)
*G08G 1/16* (2006.01)
*B60W 30/18* (2012.01)

(52) U.S. Cl.
CPC ..... *B60W 30/18163* (2013.01); *G05D 1/0214* (2013.01); *G08G 1/166* (2013.01); *G08G 1/167* (2013.01); *B60W 2550/20* (2013.01); *G05D 2201/0213* (2013.01)

(58) Field of Classification Search
CPC ........ B60W 30/18163; B60W 2550/20; G05D 1/0214; G08G 1/166; G08G 1/167; B60D 2201/0213

USPC .......................................................... 701/23
See application file for complete search history.

(56) References Cited

U.S. PATENT DOCUMENTS

| 2009/0012703 | A1  | 1/2009 | Aso et al. |
| 2015/0194055 | A1* | 7/2015 | Maass ................... B60W 50/14 340/905 |
| 2017/0084178 | A1* | 3/2017 | Jain ........................ G08G 1/167 |

FOREIGN PATENT DOCUMENTS

| DE | 102012025328 A1 | 7/2013 |
| WO | 2007102405 A1 | 9/2007 |

* cited by examiner

*Primary Examiner* — Krishnan Ramesh
(74) *Attorney, Agent, or Firm* — Dinsmore & Shohl LLP

(57) ABSTRACT

An autonomous driving system acquires information concerning an empty space situation in an adjacent lane, and information concerning an entry frequency with which other vehicles enter into an own lane from the adjacent lane, when an own vehicle travels on a road having a plurality of lanes. The autonomous driving system determines whether or not to select the adjacent lane as an own vehicle travel lane in accordance with the empty space situation in the adjacent lane and the entry frequency. However, when the entry frequency is a threshold value or more, determination not to select the adjacent lane as the own vehicle travel lane is kept irrespective of the empty space situation in the adjacent lane. The autonomous driving system performs lane change to the adjacent lane autonomously when the adjacent lane is selected as the own vehicle travel lane.

5 Claims, 11 Drawing Sheets

| Standard traveling speed[km/h] | Traveling speed of preceding vehicle of own lane [km/h] | Vehicle density of own lane |
|---|---|---|
| 60 | 20 | (Representative value of standard vehicle density)*1.7 |
| | 40 | (Representative value of standard vehicle density)*1.3 |
| | 60 or more | (Representative value of standard vehicle density)*1 |
| 100 | 60 | (Representative value of standard vehicle density)*1.5 |
| | 80 | (Representative value of standard vehicle density)*1.2 |
| | 100 or more | (Representative value of standard vehicle density)*1 |

Fig.10

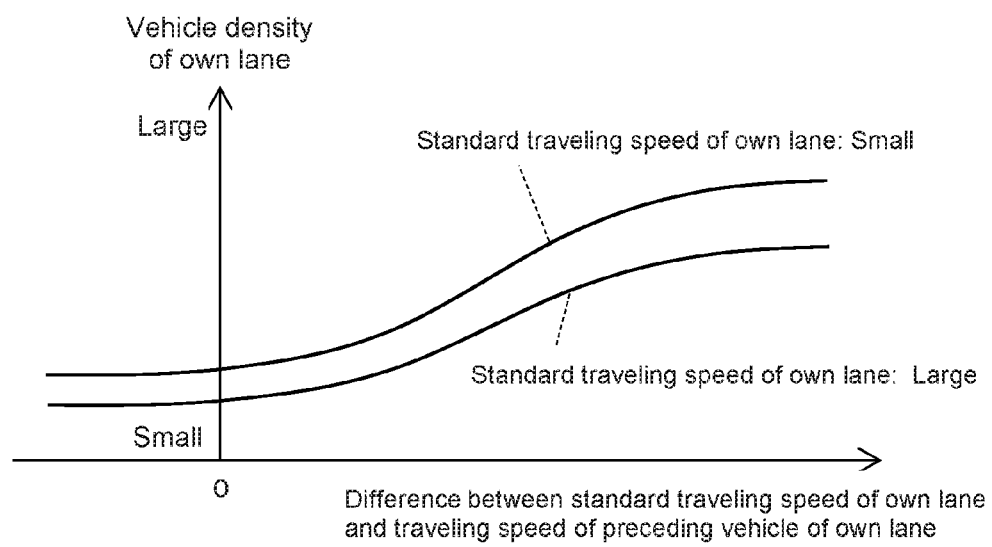

Fig.11

AUTONOMOUS DRIVING SYSTEM

CROSS-REFERENCE TO RELATED APPLICATION

This application claims priority to Japanese Patent Application No. 2016-157601, filed on Aug. 10, 2016, which is incorporated by reference herein in its entirety.

BACKGROUND

Field

The present disclosure relates to an autonomous driving system mounted on a vehicle.

Background Art

DE 102012025328A1 discloses a device that determines whether or not to execute lane change based on vehicle speeds of and inter-vehicle distances of vehicles traveling in an adjacent lane when determining that a driver has an intention to perform lane change.

SUMMARY

There may be a case in which only a specific lane is empty in a road having a plurality of lanes. There are various reasons for the specific lane being empty. The reason for the lane being empty may be that a number of vehicles avoid traveling on the lane because a traveling hindrance factor is present ahead, such as a construction section being ahead, and an accident occurring ahead.

In the case like this, if lane change is made to the empty lane, return to the original lane will have to be performed immediately. The lane change in this case is a totally useless action, and an occupant is likely to feel a sense of discomfort regarding the action. Further, a useless lane change causes a disturbance in a traffic flow, and hinders realization of a smooth traffic flow.

The present disclosure is made in the light of the problem as described above, and has an object to provide an autonomous driving system that can contribute to realization of a smooth traffic flow by decreasing useless lane change which causes a disturbance in a traffic flow.

An autonomous driving system according to the present disclosure includes at least an information acquisition section, a lane selection section and a control section. The information acquisition section is configured to acquire information concerning an empty space situation of an adjacent lane that is adjacent to a lane on which an own vehicle is traveling, and information concerning an entry frequency with which other vehicles enter into the lane on which the own vehicle is traveling from the adjacent lane, when the own vehicle travels on a road having a plurality of lanes. The lane selection section is configured to determine whether or not to select the adjacent lane as an own vehicle travel lane in accordance with the empty space situation of the adjacent lane and the entry frequency which are acquired by the information acquisition section. In detail, the lane selection section is configured to keep determination not to select the adjacent lane as the own vehicle travel lane irrespective of the empty space situation in the adjacent lane, when the entry frequency is a threshold frequency or more. The control section is configured to make lane change to the adjacent lane autonomously, or propose lane change to the adjacent lane to a driver, when the lane selection section selects the adjacent lane as the own vehicle travel lane.

According to the above described configuration, such a useless vehicle action can be reduced, that performs lane change to a lane which is empty for some reason, and thereby has to make lane change to the original lane again. Consequently, according to the autonomous driving system according to the present disclosure, an occupant can be restrained from feeling a sense of discomfort. Further, according to the autonomous driving system according to the present disclosure, contribution can be made to realization of a smooth traffic flow by suppressing a disturbance in a traffic flow caused by useless lane change being performed.

The lane selection section may be configured to determine the threshold frequency in accordance with at least a difference between a flow state in the adjacent lane and a flow state in an own lane on which the own vehicle is traveling. Further, the lane selection section may be configured to determine the threshold frequency in accordance with at least a difference between a congestion state in the adjacent lane and a congestion state in the own lane. According to these configurations, a relative relation between the adjacent lane and the own lane such as the difference in the flow state and the difference in the congestion state between the adjacent lane and the own lane can be reflected in the threshold frequency. Lane change of other vehicles to the own lane from the adjacent lane includes lane change caused by a relative relation between the adjacent lane and the own lane, in addition to lane change due to the fact that the traveling hindrance factor is present ahead on the adjacent lane. Therefore, the relative relation between the adjacent lane and the own lane is reflected in the threshold frequency, whereby the determination precision of whether to select the adjacent lane as the own vehicle travel lane can be enhanced.

Further, the lane selection section may be configured to determine the threshold frequency in accordance with at least an exit frequency with which other vehicles exit to the adjacent lane from the own lane. It can be said that as the number of other vehicles that exit to the adjacent lane from the own lane is larger, the possibility of the traveling hindrance factor being present ahead in the adjacent lane is smaller. Therefore, according to the configuration, determination precision of whether to select the adjacent lane as the own vehicle travel lane can be more enhanced.

The lane selection section may be configured to perform in the following three kinds of determination processing. In first determination processing, the lane selection section determines whether or not the empty space situation in the adjacent lane satisfies a selection reference for selecting the adjacent lane as the own vehicle travel lane. In second determination processing, the lane selection section determines whether or not the entry frequency is smaller than the threshold frequency. In third determination processing, the lane selection section selects the adjacent lane as the own vehicle travel lane on condition that the empty space situation in the adjacent lane satisfies the selection reference, and the entry frequency is smaller than the threshold frequency. When the lane selection section is configured like this, the adjacent lane is not sometimes selected as the own vehicle travel lane because the entry frequency is the threshold value or more although the empty space situation in the adjacent lane satisfies the selection reference. The control section may be configured to propose lane change to the adjacent lane to a driver in such a case. By being configured like this, final judgment of lane change in the case of the frequency of entry of other vehicles to the own lane from the adjacent lane being high is entrusted to an occupant (a driver). Consequently, the occupant can be restrained from feeling a sense of discomfort to a result of performing lane change or a result of not performing lane change.

According to the autonomous driving system according to the present disclosure, lane change to an empty lane for the reason of a construction section being ahead, an accident occurring ahead and the like can be reduced, and therefore, a useless vehicle action that has to make lane change to the original lane again can be reduced. Consequently, according to the autonomous driving system according to the present disclosure, an occupant can be restrained from feeling a sense of discomfort. Further, according o the autonomous driving system according to the present disclosure, contribution to realization of a smooth traffic flow can be made by suppressing a disturbance in a traffic flow caused by useless lane change being performed.

BRIEF DESCRIPTION OF DRAWINGS

FIG. 10 is a diagram for explaining a calculation method of an own lane vehicle density according to a second embodiment;

FIG. 11 is a diagram for explaining the calculation method of the own lane vehicle density according to the second embodiment;

DETAILED DESCRIPTION

Hereunder, embodiments of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, the structures that are described in the embodiments shown as follows are not always indispensable to the disclosure unless specially explicitly shown otherwise, or unless the disclosure is explicitly specified by the structures theoretically.

First Embodiment 1-1. Configuration of Autonomous Driving Vehicle

Figure 1:
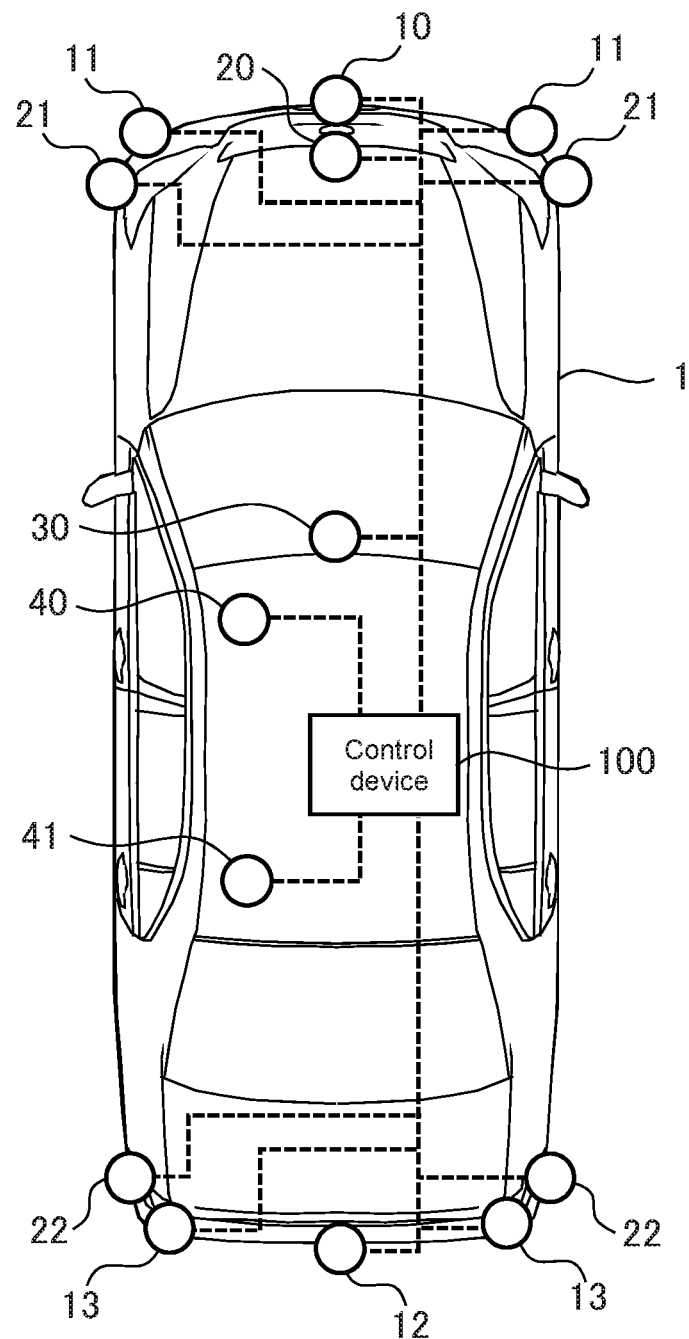
FIG. 1 is a view illustrating an example of an autonomous driving vehicle to which an autonomous driving system according to a first embodiment is applied.

FIG. 1 is a view illustrating an example of an autonomous driving vehicle on which an autonomous driving system according to a first embodiment is mounted. The autonomous driving system performs autonomous driving of a vehicle on which the system is mounted. Note that autonomous driving means that driving operations such as acceleration, deceleration and steering of a vehicle is executed without a driving operation of a driver.

As illustrated in FIG. 1, a vehicle 1 mounted on the autonomous driving system includes an autonomous recognition sensor for directly acquiring information concerning a road on which the vehicle 1 is traveling and information concerning objects that are present in the surroundings of the vehicle 1. The autonomous recognition sensor includes at least one of LIDARs (LIDAR: Laser Imaging Detection and Ranging) 10, 11, 12 and 13, radars 20, 21 and 22 and a camera 30. Further, the vehicle 1 includes a communication device for indirectly acquiring at least a part of these kinds of information from an external system not illustrated. The communication device includes at least one of a road-vehicle communication device 40 and a mobile communication device 41. These autonomous recognition sensor and communication device are connected to a control device 100 that is mounted on the vehicle 1 directly or via a communication network such as a CAN (Controller Area Network) constructed in the vehicle.

The LIDARs include a front LIDAR 10 that detects an object in front of the vehicle 1, front side LIDARs 11 and 11 that detect objects in front sides of the vehicle 1, a rear LIDAR 12 that detects an object in rear of the vehicle 1, and rear side LIDARs 13 and 13 that detect objects in rear sides of the of the vehicle 1. The LIDARs 10 to 13 output object information concerning detected objects to the control device 100. The object information includes distances and directions of the detected objects from the vehicle 1. Based on the object information obtained by these LIDARs 10, 11, 12 and 13, the control device 100 can grasp a situation of substantially entire surroundings of the vehicle 1. Note that installation positions of the LIDARs and the number of LIDARs that are installed can be determined in accordance with scanning ranges of the LIDARs. Instead of a plurality of LIDARs, only one LIDAR that performs sensing of the entire surroundings of the vehicle 1 may be used.

The radars are millimeter wave radars, for example. The radars include a front radar 20 that detects an object in front of the vehicle 1, front short range radars 21 and 21 that detect objects in a vicinity of the front, and rear short range radars 22 and 22 that detect objects in a vicinity of the rear, for example. The radars 20 to 22 output object information concerning detected objects to the control device 100. The object information includes distances and directions of the detected objects from the vehicle 1.

The camera 30 is provided at a back side of a windshield of the vehicle 1, and picks up an image of a region in front of the vehicle 1, for example. The camera 30 may be a monocular camera, or a stereo camera. The camera 30 outputs picked-up image information to the control device 100. Note that the camera, the LIDARs and the radars do not necessarily have to be included redundantly.

The road-vehicle communication device 40 transmits own vehicle information that is information on the vehicle 1 to infrastructure equipment such as a road side device, and receives road traffic information from the infrastructure equipment. The road traffic information includes information concerning a surrounding situation of the vehicle 1. The road-vehicle communication includes communication with a road traffic information communication system (Vehicle Information and Communication system), for example. The road-vehicle communication device 40 outputs information concerning the surrounding situation of the vehicle 1 which is received to the control device 100.

The mobile communication device 41 transmits the own vehicle information of the vehicle 1 and information acquired by the autonomous recognition sensor to a server on the Internet via a mobile communication system such as 3G, 4G and LTE, and receives information concerning the surrounding situation of the vehicle 1 from the server. The mobile communication device 41 outputs the information concerning the surrounding situation of the vehicle 1 which is received to the control device 100. Note that the mobile communication device 41 and the road-vehicle communication device 40 do not necessarily have to be included redundantly. Further, these communication devices are not always indispensable in the vehicle 1.

1-2. Configuration of Autonomous Driving System

Figure 2:
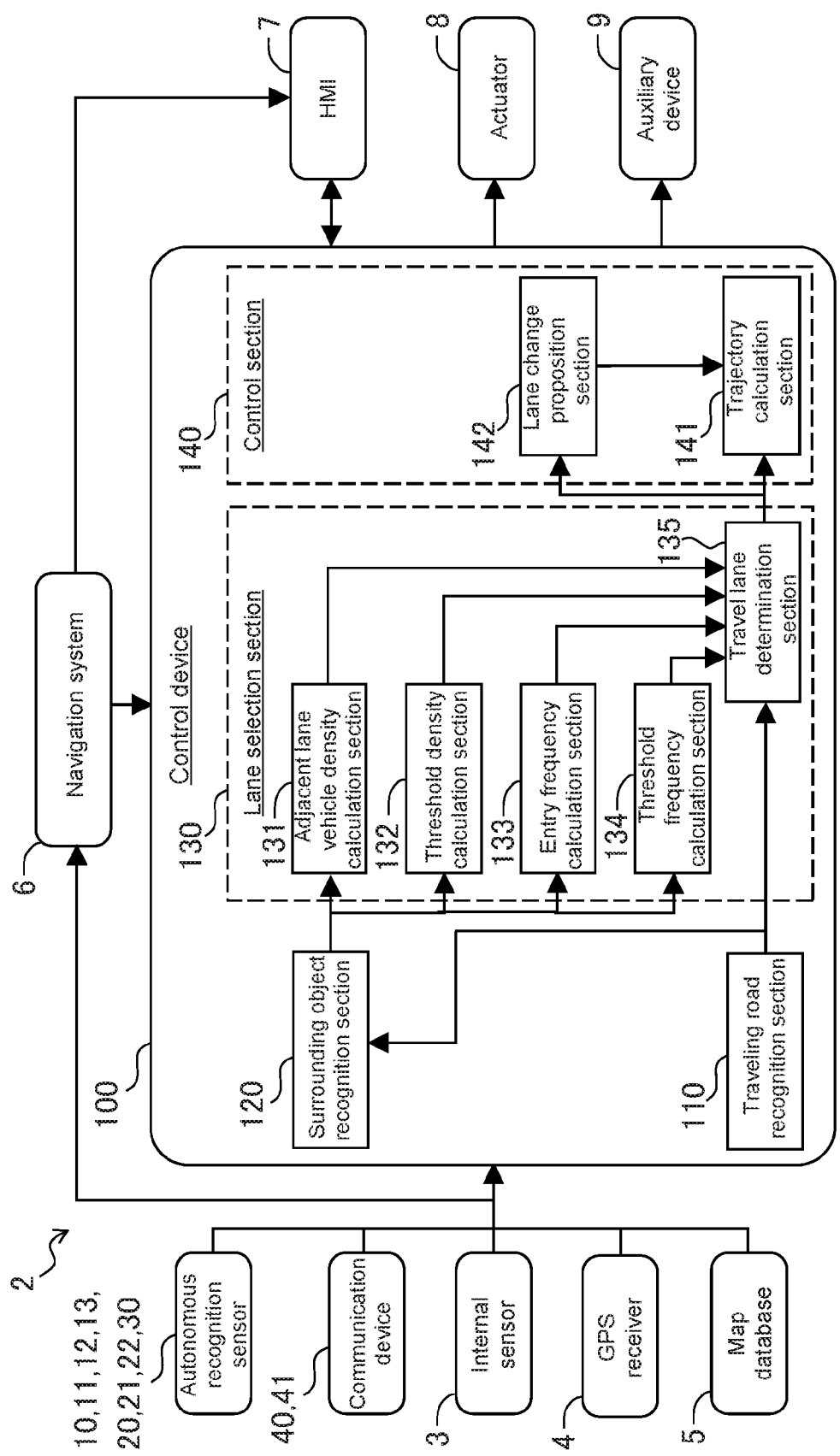
FIG. 2 is a block diagram illustrating a configuration of an autonomous driving system according to the first embodiment.

Next, a configuration of the autonomous driving system of the present embodiment will be described with use of FIG. 2. As illustrated in FIG. 2, an autonomous driving system 2 includes an internal sensor 3, a GPS (Global Positioning System) receiver 4, a map database 5, a navigation system 6, an HMI (Human Machine Interface) 7, an actuator 8 and an auxiliary device 9, in addition to the control device 100, autonomous recognition sensors 10 to 13, 20 to 22 and 30, and the communication devices 40 and 41 described above.

The internal sensor 3 includes at least one of a vehicle speed sensor, an acceleration sensor and a yaw rate sensor, for example. By these sensors, information concerning a traveling state of the own vehicle is obtained. Further, the internal sensor 3 includes a steering sensor in order to obtain information concerning a steering operation by a driver. The internal sensor 3 outputs the acquired information to the control device 100.

The GPS receiver 4 acquires positional information indicating a position of the own vehicle based on a signal transmitted by a GPS satellite. The GPS receiver 4 outputs the positional information of the own vehicle to the control device 100.

The map database 5 is formed in a storage such as an HDD and an SSD mounted on the vehicle, for example. Map information which the map database 5 has includes, for example, positional information of roads, information on road shapes, positional information of intersections and branch points, lane information of roads and the like. Note that the map database 5 may be stored in a server on the Internet that is communicable by the mobile communication device 41.

The navigation system 6 is a device that performs guidance to a destination that is set on the map by the driver to the driver. The navigation system 6 calculates a route on which the own vehicle travels, based on the positional information of the own vehicle which is measured by the GPS receiver 4 and the map information in the map database 5. The navigation system 6 transmits information on a calculated route to the driver via the HMI 7, and outputs the information on the calculated route to the control device 100. Note that a part of processing that is performed by the navigation system 6 may be performed by a server on the Internet that is communicable by the mobile communication device 41.

The HMI 7 is an interface for outputting and inputting information to and from an occupant and the autonomous driving system 2. The HMI 7 includes, for example, a display for displaying image information to the occupant, a speaker for audio output, a touch panel for the occupant to perform an input operation and the like.

The actuator 8 is a device that operates in response to an operation signal from the control device 100, and changes the traveling state of the vehicle by the operation. The actuator 8 is provided at each of a drive system, a braking system, and a steering system, for example. The auxiliary device 9 is a generic name for devices that are not included in the actuator 8, and includes, for example, a direction indicator lamp, a headlight and the like.

The control device 100 is an ECU (Electronic Control Unit) having at least one CPU, at least one ROM, and at least one RAM. In the ROM, various programs for autonomous driving and various data including maps are stored. The program stored in the ROM is loaded on the RAM and is executed by the CPU, whereby various functions are realized by the control device 100. Note that the control device 100 may be configured by a plurality of ECUs.

1-3. Functions for Autonomous Driving of Control Device

In FIG. 2, functions relating to lane change of the own vehicle is specially expressed by blocks, out of the functions for autonomous driving which the control device 100 has. Illustration of the other functions for autonomous driving which the control device 100 has is omitted.

The control device 100 has a function of selecting a lane on which the own vehicle should travel from a plurality of lanes when the own vehicle travels on a road having a plurality of lanes, and executing autonomous lane change to the selected lane. The function is realized by a traveling road recognition section 110, a surrounding object recognition section 120, a lane selection section 130 and a control section 140 that are included by the control device 100. Note that these sections 110, 120, 130 and 140 do not exist as hardware in the control device 100, but are realized by software when the program stored in the ROM is executed by the CPU.

The traveling road recognition section 110 recognizes a traveling road on which the own vehicle is traveling. A road on which the own vehicle is traveling is a road having a plurality of lanes, the traveling road recognition section 110 also performs recognition of a lane on which the own vehicle is traveling. As methods for recognizing a traveling road by the traveling road recognition section 110, there are at least two methods as follows. A first method is a method that performs traveling road recognition based on map information concerning the road on which the own vehicle is traveling and positional information of the own vehicle. The map information is acquired from the map database 5. The positional information of the own vehicle is acquired from the GPS receiver 4. A second method is a method that extracts traffic lane lines (a white line, a yellow line, a median strip and the like) of a road by processing image pickup information acquired from the camera 30, and performs traveling road recognition based on the traffic lane lines. Either one of the traveling road recognition using the map information and the positional information, and the road recognition using the image pickup information may be used, or both of them may be used in combination. The traveling road recognition section 110 outputs the information concerning the recognized traveling road to the surrounding object recognition section 120 and the lane selection section 130.

The surrounding object recognition section 120 recognizes objects existing around the own vehicle. In recognition of surrounding objects, information acquired from the autonomous recognition sensors 10 to 13, 20 to 22 and 30 is used. The surrounding object recognition section 120 is capable of recognizing surrounding objects by at least one method of using the information of the LIDARs 10 to 13, using the information of the radars 20 to 22, using the information of the camera 30, and using information of a plurality of kinds of autonomous recognition sensors in combination by sensor fusion. The recognized surrounding objects include movable objects such as other vehicles and pedestrians, and stationary objects such as corner stones, guard rails, buildings and trees. Note that the other vehicles mentioned here also include a motor cycle if the motor cycle is traveling on the same lane with automobiles.

The surrounding object recognition section 120 acquires information concerning the traveling road recognized by the traveling road recognition section 110. When the road on which the own vehicle is traveling is a road having a plurality of lanes, the information acquired from the road recognition section 110 also includes the information concerning a traveling lane. The surrounding object recognition section 120 discriminates other vehicles traveling on an own lane (a lane on which the own vehicle is traveling), and other vehicles traveling on an adjacent lane that is adjacent to the own lane, from the recognized surrounding objects, by using the information concerning the traveling road. The surrounding object recognition section 120 outputs positions and speeds of the other vehicles traveling on the own lane, and positions and speeds of the other vehicles traveling on the adjacent lane to the lane selection section 130 as recognition information. Further, the surrounding object recognition section 120 detects another vehicle that enters into the own lane from the adjacent lane, and another vehicle that exits to the adjacent lane from the own lane respectively. Information on these vehicles is also included in the recognition information which is outputted to the lane selection section 130 from the surrounding object recognition section 120. Note that the information concerning the positions and speeds of the other vehicles traveling on the adjacent lane corresponds to "information concerning an empty space situation of the adjacent lane". Further, information on other vehicles that enter into the own lane from the adjacent lane also corresponds to "information concerning an entry frequency of the other vehicles entering into the own lane from the adjacent lane". Consequently, a function of the surrounding object recognition section 120 includes a function as an information acquisition section that is specified in the claims of the present application.

The lane selection section 130 selects a lane on which the own vehicle travels, based on the recognition information that is inputted from the road recognition section 110 and the surrounding object recognition section 120 respectively. In detail, the lane selection section 130 selects whether to keep the present own vehicle travel lane, or to perform lane change to the adjacent lane. In order to realize the function, the lane selection section 130 includes an adjacent lane vehicle density calculation section 131, a threshold density calculation section 132, an entry frequency calculation section 133, a threshold frequency calculation section 134, and a travel lane determination section 135.

The adjacent lane vehicle density calculation section 131 acquires recognition information on surrounding objects that is inputted to the lane selection section 130 from the surrounding object recognition section 120. The recognition information on the surrounding objects includes positions and speeds of the other vehicles traveling on the adjacent lane. The adjacent lane vehicle density calculation section 131 calculates a vehicle density in the adjacent lane based on the positions and the speeds of the other vehicles traveling on the adjacent lane. The vehicle density in the adjacent lane is one of parameters indicating the empty space situation of the adjacent lane. Here, the vehicle density in the adjacent lane is defined as the number of the other vehicles which are present per unit distance in the adjacent lane. The adjacent lane vehicle density calculation section 131 updates a calculation value of the vehicle density in the adjacent lane at predetermined periods. Details of a calculation method of the vehicle density by the adjacent lane vehicle density calculation section 131 will be described later.

The threshold density calculation section 132 calculates a threshold density to the vehicle density in the adjacent lane which is calculated by the adjacent lane vehicle density calculation section 131. The threshold density is an evaluation reference for evaluating whether the vehicle density in the adjacent lane is high or low, and is a selection reference for determining whether to select the adjacent lane as the own vehicle travel lane. The threshold density calculation section 132 acquires recognition information of surrounding objects that is inputted to the lane selection section 130 from the surrounding object recognition section 120, and calculates the threshold density in accordance with relations between the own vehicle and surrounding vehicles that are determined based on the recognition information of the surrounding objects. The threshold density calculation section 132 updates a calculation value of the threshold density at periods that are set in advance. Details of the calculation method of the threshold density by the threshold density calculation section 132 will be described later.

The entry frequency calculation section 133 acquires recognition information of surrounding objects that is inputted to the lane selection section 130 from the surrounding object recognition section 120. The recognition information of the surrounding objects includes the information concerning other vehicles entering into the own lane from the adjacent lane. The entry frequency calculation section 133 calculates the entry frequency with which other vehicles enter into the own lane from the adjacent lane based on the acquired information. Here, the entry frequency of other vehicles is defined as a ratio of the other vehicles entering into the own lane out of the other vehicles traveling on the adjacent lane. The entry frequency calculation section 133 updates a calculation value of the entry frequency at periods set in advance. Details of a calculation method of the entry frequency by the entry frequency calculation section 133 will be described later.

The threshold frequency calculation section 134 calculates a threshold frequency to the entry frequency of other vehicles that is calculated by the entry frequency calculation section 133. The threshold frequency is an evaluation reference for evaluating whether the entry frequency of other vehicles entering into the own lane from the adjacent lane is high or low. The threshold frequency calculation section 134 calculates the threshold frequency based on the recognition information of the surrounding objects that is inputted to the lane selection section 130 from the surrounding object recognition section 120. The threshold frequency calculation section 134 updates a calculation value of the threshold frequency at periods set in advance. Details of a calculation method of the threshold frequency by the threshold frequency calculation section 134 will be described later.

The travel lane determination section 135 determines the travel lane based on comparison of the vehicle density in the adjacent lane, which is calculated by the adjacent lane vehicle density calculation section 131, and the threshold density calculated by the threshold density calculation section 132, and based on comparison of the entry frequency of other vehicles, which is calculated by the entry frequency calculation section 133, and the threshold frequency that is calculated by the threshold frequency calculation section 134. In determination of the travel lane, either one of keeping a present own vehicle travel lane or changing the own vehicle travel lane to the adjacent lane is selected. The travel lane determination section 135 outputs information concerning the determined travel lane to the control section 140. Details of the determination method of the travel lane by the travel lane determination section 135 will be described later.

The control section 140 controls travel of the own vehicle based on information that is inputted from the lane selection section 130. Control by the control section 140 includes two modes as follows, for example. According to a first mode, lane change to the adjacent lane is performed autonomously when performing lane change to the adjacent lane is selected by the lane selection section 130. According to a second mode, in a case where the lane selection section 130 selects to perform lane change to the adjacent lane, proposition to a driver is performed by a lane change proposition section 142.

The lane change proposition section 142 proposes lane change to the adjacent lane to the driver via the HMI 7. When control is performed in the second mode, the control section 140 autonomously performs lane change to the adjacent lane when the driver agrees to a proposal of the lane change proposition section 142, and keeps the present oven vehicle travel lane when the driver does not agree to the proposal. In order to realize the function like this, the lane selection section 130 includes a trajectory calculation section 141 that calculates a trajectory that should be followed by the own vehicle.

The trajectory calculation section 141 calculates a target trajectory based on information concerning the travel lane which is inputted from the travel lane determination section 135. When the travel lane determination section 135 selects to keep the present own vehicle travel lane in the first mode, and when the driver does not agree to the proposal of the lane change proposition section 142 in the second mode, the trajectory calculation section 141 calculates a target trajectory along the present oven vehicle travel lane. When the travel lane determination section 135 selects to change the own vehicle travel lane to the adjacent lane in the first mode, and when the driver agrees to the proposal of the lane change proposition section 142 in the second mode, the trajectory calculation section 141 calculates a target trajectory in which the own vehicle is moved to the adjacent lane from the present own vehicle travel lane. Concerning each of lane keeping and lane change, the method for trajectory calculation is not limited. The control section 140 calculates an operation amount of the actuator 8 of at least one of the drive system, the braking system and the steering system based on the target trajectory calculated in the trajectory calculation section 141. The control section 140 operates the actuator 8 in accordance with the calculated operation amount, and thereby controls travel of the own vehicle.

1-4. Details of Calculation Method of Vehicle Density

Figure 3:
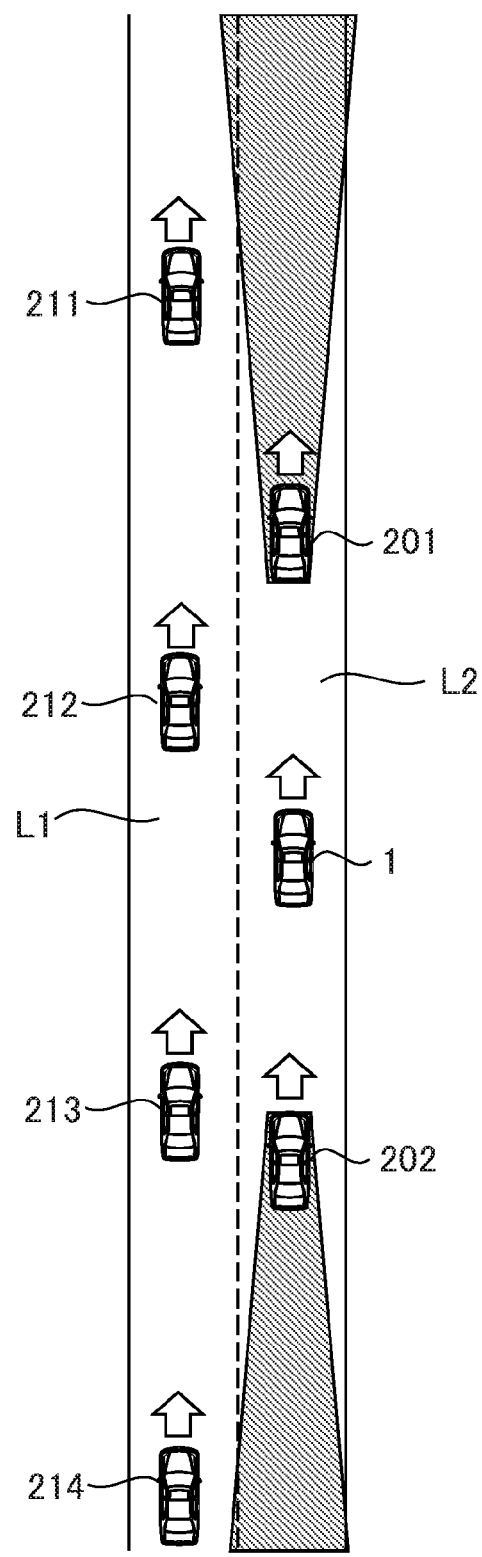
FIG. 3 is a view for explaining surrounding object recognition by an autonomous driving system according to the first embodiment.

Details of the calculation method of the vehicle density by the adjacent lane vehicle density calculation section 131 will be described with use of FIG. 3. FIG. 3 illustrates a state in which the oval vehicle 1 travels on a second lane L2 in a road having a first lane L1 and the second lane L2. During traveling of the own vehicle 1, other vehicles which are present around the own vehicle 1 are recognized by the autonomous recognition sensors 10 to 13, 20 to 22 and 30 (refer to FIG. 1) included by the own vehicle 1.

In an example illustrated in FIG. 3, a preceding vehicle 201 and a following vehicle 202 that travel on an own lane (the second lane) L2 are recognized. Other vehicles may be present respectively ahead of the preceding vehicle 201 and behind the following vehicle 202, but these vehicles are in blind spots (regions illustrated by oblique lines in FIG. 3) of the autonomous recognition sensors, and therefore it is difficult for the autonomous recognition sensors to recognize these vehicles. On the adjacent lane (the first lane) L1, vehicles which are present in a range of approximately 100 to 200 m in front and rear of the own vehicle 1 are recognized, although it depends on ranges of the blind spots of the autonomous recognition sensors. In the example illustrated in FIG. 3, four vehicles 211, 212, 213 and 214 that travel on the adjacent lane L1 are recognized.

The adjacent lane vehicle density calculation section 131 calculates the vehicle density in the adjacent lane L1 from positional information of continuous three vehicles or more that travel on the adjacent lane L1. Specifically, when N (>3) vehicles are located on the adjacent lane L1, the spaces among the vehicles that travel one behind another are acquired respectively, and thereby N−1 (>2) of inter-vehicle distances can be defined. The adjacent lane vehicle density calculation section 131 calculates a representative value of N−1 of inter-vehicle distances, takes an inverse value of the representative value, and thereby calculates the number of vehicles present per unit distance of the adjacent lane L1, that is, the vehicle density in the adjacent lane L1. In the example illustrated in FIG. 3, the representative value of the inter-vehicle distances is calculated based on an inter-vehicle distance between the vehicle 211 and the vehicle 212, an inter-vehicle distance between the vehicle 212 and the vehicle 213, and an inter-vehicle distance between the vehicle 213 and the vehicle 214. As the calculation method of the representative value of the inter-vehicle distances, for example, taking a statistic average value of the respective inter-vehicle distances, taking a medium value and the like are cited. Further, taking the average value after assigning weights to the respective inter-vehicle distances, and taking the average value after excluding inter-vehicle distances of a threshold value or more may be adopted. Further, the representative value may be defined by a function with the respective inter-vehicle distances as arguments. Note that when the number of vehicles traveling in the range which is recognizable by the autonomous recognition sensors is two or less, the adjacent lane vehicle density calculation section 131 outputs a minimum value that is set in advance as the vehicle density of the adjacent lane L1.

1-5. Details of Calculation Method of Threshold Density

In the present embodiment, the threshold density calculation section 132 acquires a relative speed to the own vehicle, of other vehicles traveling in the adjacent lane that is included in the recognition information of surrounding objects. In the example illustrated in FIG. 3, in a case where a traveling speed of the own vehicle 1 is lower than traveling speeds of other vehicles traveling on the adjacent lane, a relative speed may be calculated from a difference between an average speed of the plurality of vehicles 211 and 212 that pass the own vehicle 1 and the traveling speed of the own vehicle 1. Further, when the traveling speed of the own vehicle 1 is higher than the traveling speeds of other vehicles traveling on the adjacent lane, a relative speed may be calculated from a difference between an average speed of the plurality of vehicles 213 and 214 which the own vehicle 1 passes and the traveling speed of the own vehicle 1. Alternatively, respective relative speeds are calculated from changes of positions of all the vehicles 211, 212, 213 and 214 which can be recognized, and an average value of the relative speeds may be calculated. Further, instead of the traveling speed of the own vehicle 1, a traveling speed of a vehicle traveling on the own lane, for example, a preceding vehicle may be used.

Figure 4:
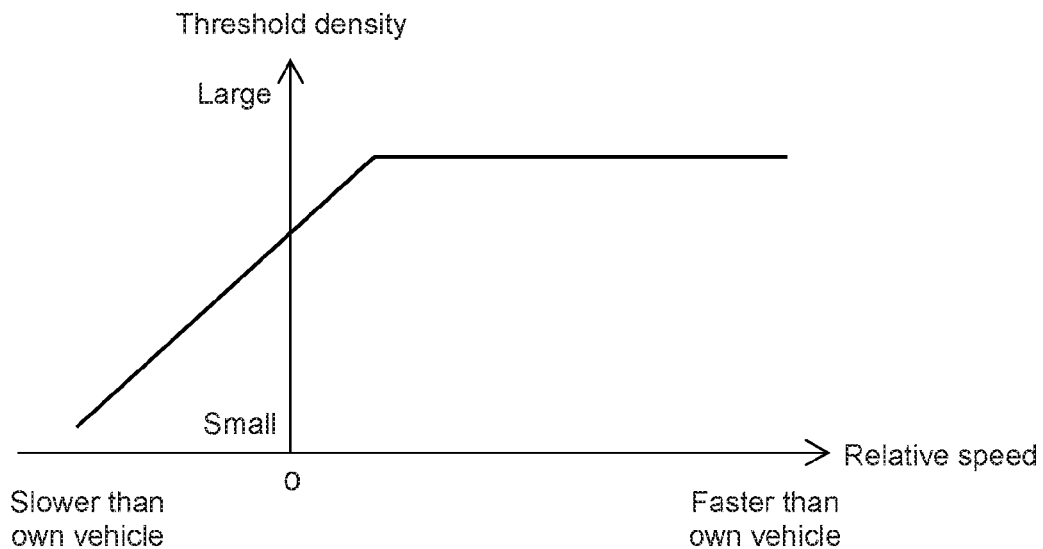
FIG. 4 is a diagram for explaining a calculation method of a threshold density according to the first embodiment.

The threshold density calculation section 132 calculates a threshold density from the relative speed, by using a map in which a relation illustrated in FIG. 4 is specified. According to the map, as the traveling speed of the other vehicles traveling in the adjacent lane is lower than the traveling speed of the own vehicle, the threshold density is set at a smaller value. Further, as the relative speed becomes higher, the threshold density is set at a larger value, and at a relative speed equal to or higher than a fixed speed, the threshold density is set at substantially the same density. The threshold density is an evaluation reference for evaluating whether the vehicle density in the adjacent lane is high or low. Therefore, according to setting of the threshold density shown in the map, when a flow speed in the adjacent lane is lower than a flow speed in the own lane, the vehicle density in the adjacent lane tends to be evaluated as relatively high. On the other hand, when the flow speed in the adjacent lane is higher than the flow speed in the own lane, the vehicle density in the adjacent lane tends to be evaluated as relatively low.

1-6. Details of Calculation Method of Entry Frequency

Figure 5:
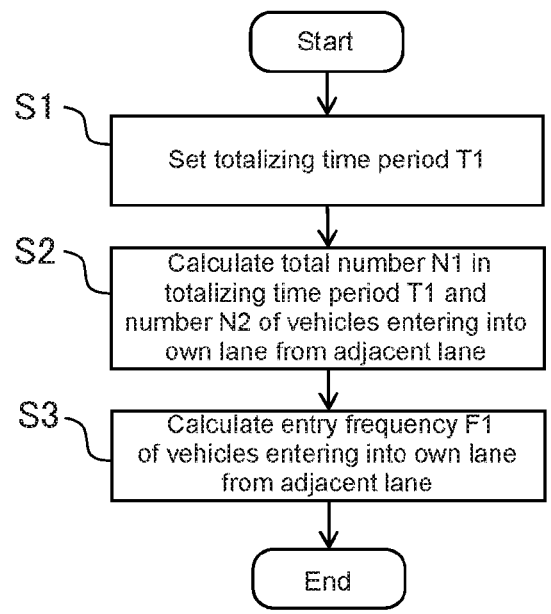
FIG. 5 is a flowchart for explaining a calculation method of an entry frequency according to the first embodiment.
Figure 6:
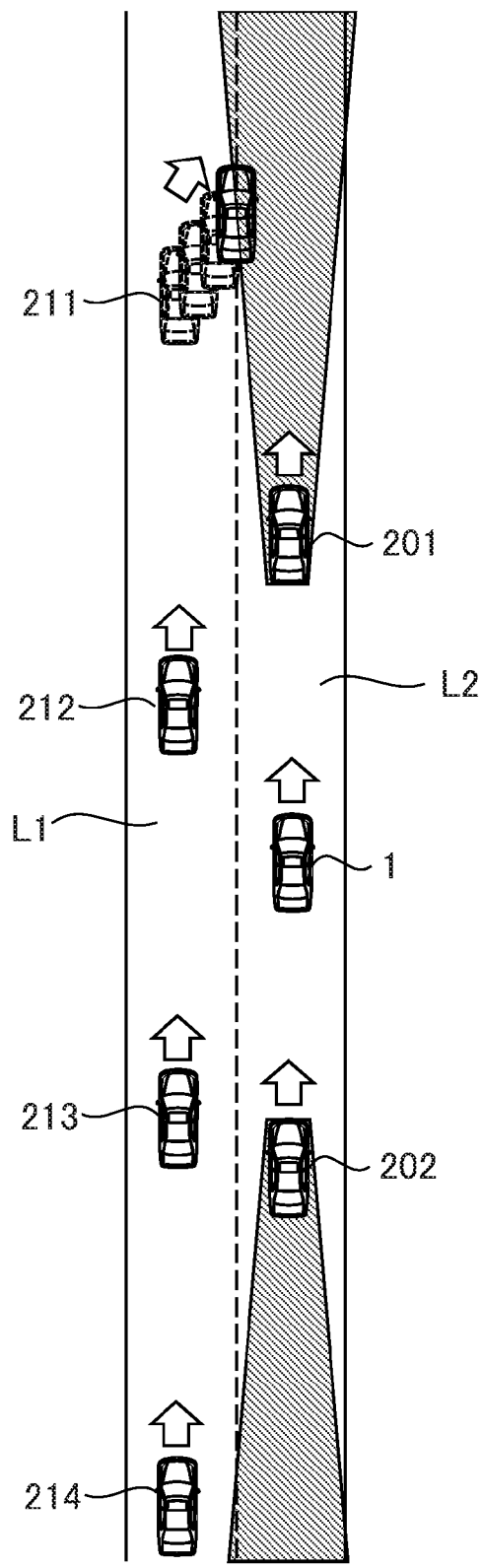
FIG. 6 is a view for explaining a method for detecting another vehicle that enters into an own lane from an adjacent lane.

Details of the calculation method of the entry frequency by the entry frequency calculation section 133 will be described by using FIGS. 5 and 6. FIG. 6 illustrates a state in which on a road having the first lane L1 and the second lane L2, the own vehicle 1 is traveling on the second lane L2. During traveling of the own vehicle 1, a vehicle that enters into the own lane L2 from the adjacent lane L1 is detected by the autonomous recognition sensors 10 to 13, 20 to 22 and 30 (refer to FIG. 1) which are included by the own vehicle 1. In detail, positions of the vehicles 201, 202, 211, 212, 213 and 214 that are present around the own vehicle 1 are being tracked by the surrounding object recognition section 120 (refer to FIG. 2). The surrounding object recognition section 120 acquires a history of a time-series position of each of the vehicles, and determines a lane to which each of the vehicles belongs from a position of each of the vehicles to the lanes L1 and L2. Subsequently, the surrounding object recognition section 120 determines whether there is a vehicle having the lane to which the vehicle belongs shifted to the own lane L2 from the adjacent lane L1 at each period. FIG. 6 illustrates a state in which the vehicle 211 moves to the own lane L2 from the adjacent lane L1. In this example, the vehicle 211 is detected as a vehicle that enters into the own lane L2 from the adjacent lane L1.

The entry frequency calculation section 133 calculates an entry frequency based on the information concerning other vehicles that enter into the own lane from the adjacent lane, which is inputted from the surrounding object recognition section 120. Here, FIG. 5 is a flowchart illustrating the calculation method of the entry frequency by the entry frequency calculation section 133. The entry frequency calculation section 133 repeatedly performs calculation illustrated in the flowchart at periods set in advance.

First, in step S1, the entry frequency calculation section 133 sets a totalizing time period T1 for totalizing the number of vehicles that enter into the own lane from the adjacent lane. In the calculation of the entry frequency by the entry frequency calculation section 133, behaviors of the surrounding vehicles in a period to a present time from a time back to a past by the totalizing time period T1 are objects.

In step S2, the entry frequency calculation section 133 calculates a total number N1, and a number N2 of the other vehicles that enters into the own lane from the adjacent lane, with respect to other vehicles that are recognized as traveling in the adjacent lane within a time period from the present time to a time in the past by the totalizing time period T1. In calculation of the total number N1, what can be determined as the same vehicle by position tracking and shape estimation is counted as one. In the calculation of the total number N1 and the entering number N2, a relative position range of the vehicles which are objects to be calculated to the own vehicle may be limited. For example, calculation of the total number N1 and the entering number N2 may be performed for vehicles which are limited to the vehicles existing ahead of the own vehicle.

In step S3, the entry frequency calculation section 133 calculates an entry frequency F1 by using the total number N1 and the entering number N2 which are calculated in step S2. The entry frequency F1 is a real number from 0 to 1 inclusive, and is a parameter expressing that the larger the value, the higher the frequency. Specifically, a ratio (N2/N1) of the entering number N2 to the total number N1 is calculated as the entry frequency F1. Note that when the total number N1 is a threshold number thr1 set in advance or less, or the entering number N2 is a threshold number thr2 set in advance or less, the entry frequency calculation section 133 sets the value of the entry frequency F1 at zero. This is because when the number of samples is small, it cannot be determined whether entry of the vehicles to the own lane from the adjacent lane is due to the traveling hindrance factor being present ahead on the adjacent lane. Note that definition of N2/N1 as the entry frequency F1 is only an example. The entry frequency F1 may be expressed by a function with N2/N1 as a variable.

1-7. Details of Calculation Method of Threshold Frequency

Figure 7:
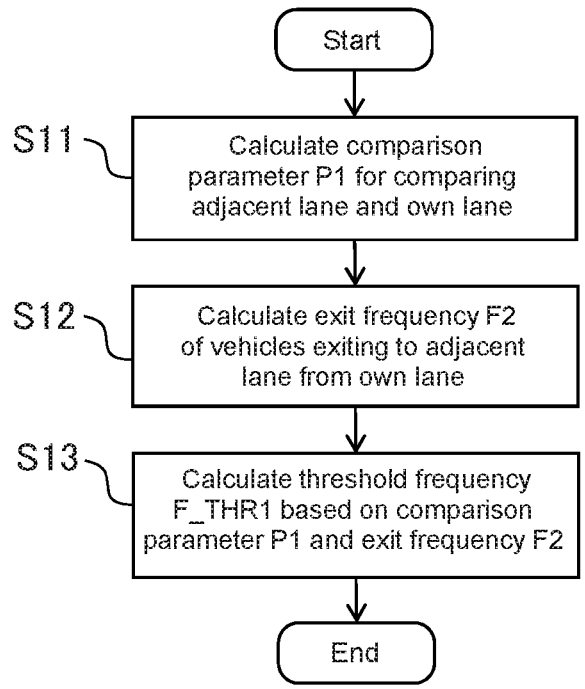
FIG. 7 is a flowchart for explaining a calculation method of a threshold frequency according to the first embodiment.

In the present embodiment, the threshold frequency calculation section 134 calculates the threshold frequency based on a relative speed of other vehicles traveling on the adjacent lane to the own vehicle, and information concerning other vehicles that exit to the adjacent lane from the own lane. These kinds of information used in calculation of the threshold frequency are included in the recognition information of the surrounding objects, which is inputted from the surrounding object recognition section 120. Here, FIG. 7 is a flowchart illustrating a calculation method of the threshold frequency by the threshold frequency calculation section 134. The threshold frequency calculation section 134 repeatedly performs calculation illustrated in the flowchart at periods set in advance.

First, in step S11, the threshold frequency calculation section 134 calculates a comparison parameter P1 for comparing the adjacent lane and the own lane. The comparison parameter P1 relates to a relative relation between lanes such as flowing states and congestion states of the lanes, and is a parameter obtained by numerically expressing a degree of an effect of urging lane change to the own lane from the adjacent lane. The comparison parameter P1 is a real number including a negative number. A value of the comparison parameter P1 of zero expresses that there is nothing that urges lane change in relationship of the adjacent lane and the own lane. The value of the comparison parameter P1 being positive expresses a situation where lane change to the own lane from the adjacent lane is urged, and the value of the comparison parameter P1 being negative expresses a situation where lane change to the adjacent lane from the own lane is urged.

Specifically, the threshold frequency calculation section 134 calculates the comparison parameter P1 based on a relative speed of other vehicles traveling on the adjacent lane to the own vehicle. The relative speed expresses a difference between a flow state in the adjacent lane and a flow state in the own lane. When there is a difference in the flow state between the adjacent lanes, vehicles naturally moves to a lane with a high-speed flow from a lane with a low-speed flow. Consequently, the threshold frequency calculation section 134 increases the value of the comparison parameter P1 when the relative speed is positive, and decreases the value of the comparison parameter P1 when the relative speed is negative. Specifically, a value obtained by multiplying the relative speed by a positive coefficient is calculated as the comparison parameter P1. The other vehicles which are objects of calculation of the relative speeds are limited to the other vehicles which are recognized as traveling on the adjacent lane within a preceding fixed time period from the present time. Further, for the traveling speed of the own vehicle, which is used in calculation of the relative speed, or the traveling speed of the preceding vehicle, an average speed within a preceding fixed time period from the present time is used. Note that the fixed time period mentioned here may be the aforementioned totalizing time period T1. These limitations relating to calculation of the relative speed are also applied to the calculation of the threshold density described above.

In step S12, the threshold frequency calculation section 134 calculates an exit frequency F2 with which other vehicles exit to the adjacent lane from the own lane. Here, the exit frequency F2 of the other vehicles is defined as a ratio of the other vehicles that exit to the adjacent lane out of the other vehicles which travel on the own lane. However, it is difficult to measure the number of the other vehicles traveling on the own lane, due to the blind spots of the autonomous recognition sensors 10 to 13, 20 to 22 and 30 (refer to FIG. 1). Consequently, in the present embodiment, the number of other vehicles traveling on the own lane and the number of other vehicles traveling on the adjacent lane are assumed to be substantially equal.

The threshold frequency calculation section 134 firstly calculates the total number N1, and a number N3 of the other vehicles which exit to the adjacent lane from the own lane respectively, with respect to the other vehicles traveling on the adjacent lane within a time period to a time back to the past by the aforementioned totalizing time period T1 from the present time. As for the total number N1, what is calculated in the entry frequency calculation section 133 may be also used. In the calculation of the total number N1 and the exit number N3, a relative position range of the vehicles that are objects of calculation to the own vehicle may be limited. For example, calculation of the total number N1 and the exit number N3 may be performed by limiting the vehicles to vehicles that are present ahead of the own vehicle, for example.

The threshold frequency calculation section 134 calculates the exit frequency F2 by using the total number N1 and the exit number N3. The exit frequency F2 is a real number from 0 to 1 inclusive, and is a parameter expressing that larger the value, the higher the frequency. Specifically, a ratio (N3/N1) of the exit number N3 to the total number N1 is calculated as the exit frequency F2. However, when the total number N1 is the threshold number thr1 that is set in advance or less, or the exit number N3 is a threshold number thr3 that is set in advance or less, the threshold frequency calculation section 134 sets the value of the exit frequency F2 at zero. Note that definition of N3/N1 as the exit frequency F2 is only an example. The exit frequency F2 may be expressed by a function with N3/N1 as a variable.

In step S13, the threshold frequency calculation section 134 calculates a threshold frequency F_THR1 based on the comparison parameter P1 calculated in step S11, and the exit frequency F2 calculated in step S12. The threshold frequency F_THR1 is a real number from 0 to 1 inclusive, and is a parameter that makes it more difficult to restrain lane change of the own vehicle as the threshold frequency F_THR1 has a larger value, and makes it easier to restrain lane change of the own vehicle as the threshold frequency F_THR1 has a smaller value. The threshold frequency F_THR1 is expressed by a function f (P1, F2) with the comparison parameter P1 and the exit frequency F2 as variables, for example.

Figure 8:
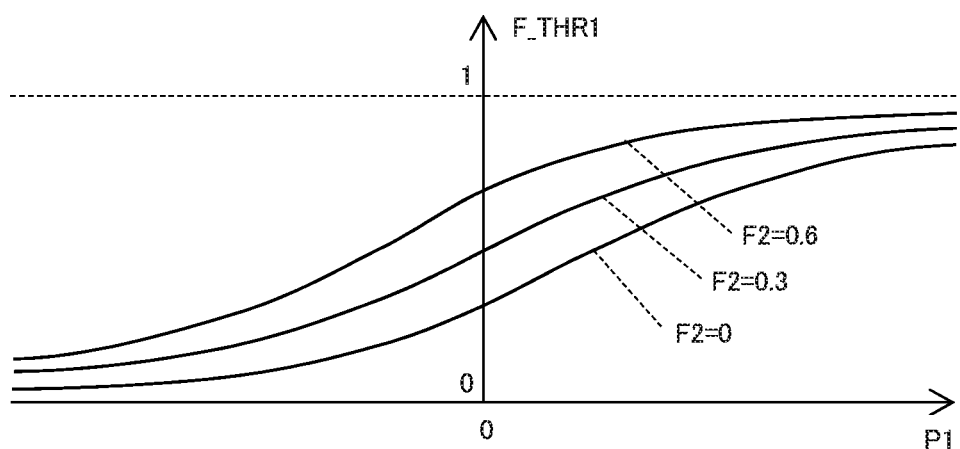
FIG. 8 is a block diagram for explaining the calculation method of the threshold frequency according to the first embodiment.

FIG. 8 is a diagram illustrating a relation between the threshold frequency F_THR1 and the comparison parameter P1, and a relation between the threshold frequency F_THR1 and the exit frequency F2. The lane change of the other vehicles to the own lane from the adjacent lane includes lane change caused by a relative relation of the adjacent lane and the own lane, in addition to the lane change due to the traveling hindrance factor being present ahead in the adjacent lane. Consequently, when the value of the comparison parameter P1 is positive, that is, in a situation where lane change to the own lane from the adjacent lane is urged by a relative relation between the adjacent lane and the own lane, the value of the threshold frequency F_THR1 is increased. Conversely, when the value of the comparison parameter P1 is negative, that is, in a situation where lane change to the adjacent lane from the own lane is urged by the relative relation between the adjacent lane and the own lane, the value of the threshold frequency F_THR1 is decreased. Further, it can be said that as the number of other vehicles that exit to the adjacent lane from the own lane is larger, a possibility of the traveling hindrance factor being present ahead in the adjacent lane is smaller. Consequently, as the value of the exit frequency F2 is larger, the value of the threshold frequency F_THR1 is made larger. Conversely, as the value of the exit frequency F2 is smaller, the value of the threshold frequency F_THR1 is made smaller. Note that it is only one example to express the threshold frequency F_THR1 by the function f (P1, P2). The threshold frequency F_THR1 may be expressed by a function with only the comparison parameter P1 as a variable, or may be expressed by a function with only the exit frequency F2 as a variable.

1-8. Details of Determination Method of Travel Lane

The travel lane determination section 135 compares the vehicle density in the adjacent lane which is calculated in the adjacent lane vehicle density calculation section 131, and the threshold density which is calculated in the threshold density calculation section 132. When the vehicle density in the adjacent lane is higher than the threshold density, the merit of changing the own vehicle travel lane to the adjacent lane is small. However, if the vehicle density in the adjacent lane is lower than the threshold density, a traffic flow can be dispersed between at least two adjacent lanes by changing the own vehicle travel lane to the adjacent lane. However, when the vehicle density in the adjacent lane is low because the traveling hindrance factor is present ahead in the adjacent lane, even if lane change is made to the adjacent lane, return to an original lane has to be performed immediately. The lane change in this case is a totally useless action to the own vehicle. Further, the action is not only useless, but also causes a disturbance in the traffic flow, and hinders realization of a smooth traffic flow.

Consequently, when the vehicle density in the adjacent lane is lower than the threshold density, the travel lane determination section 135 selects to change the own vehicle travel lane to the adjacent lane, only when the entry frequency F1 with which other vehicles enter into the own lane from the adjacent lane is lower than the threshold frequency F_THR1. When the vehicle density in the adjacent lane is the threshold density or more, or when the entry frequency F1 is the threshold frequency F_THR1 or more even though the vehicle density in the adjacent lane is lower than the threshold density, the travel lane determination section 135 keeps determination that the adjacent lane is not selected as the own vehicle travel lane.

Figure 9:
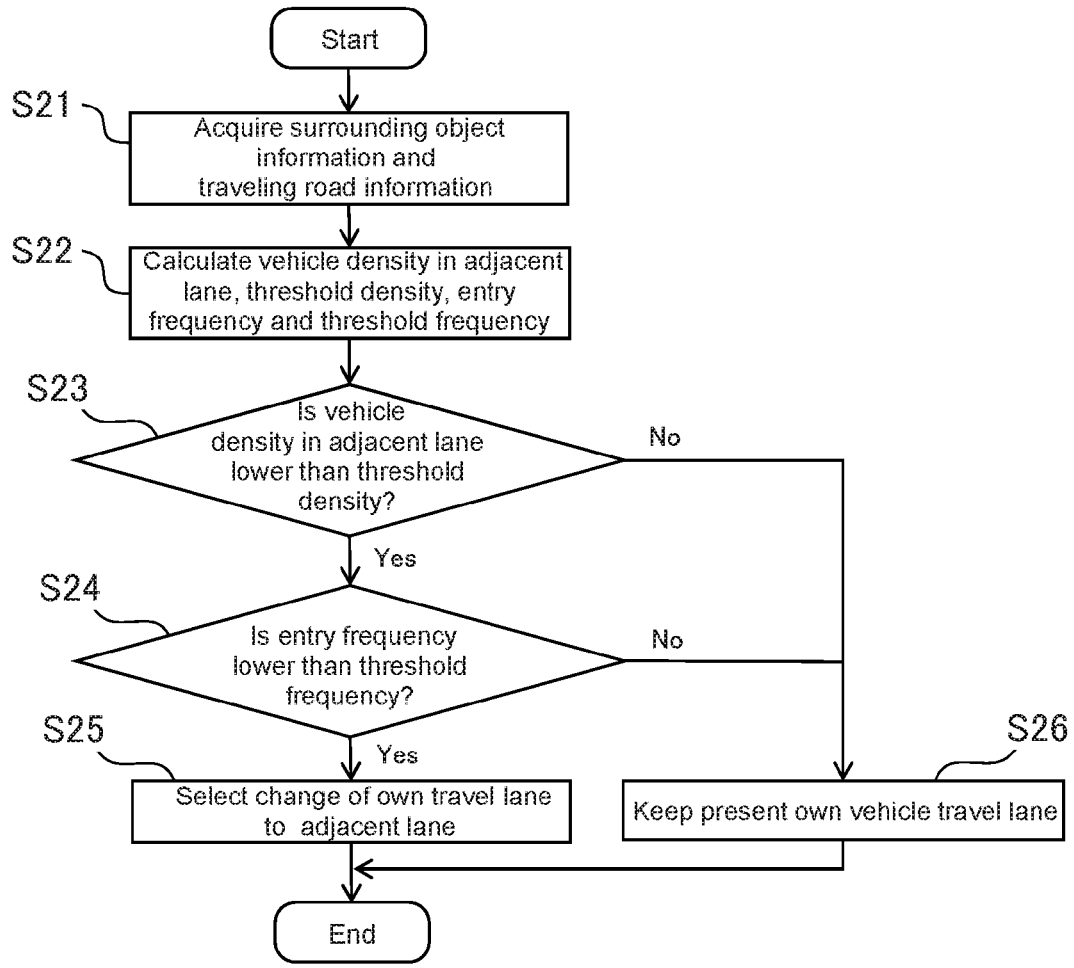
FIG. 9 is a flowchart illustrating a flow of lane selection according to the first embodiment.

Here, FIG. 9 is a flowchart illustrating a flow of lane selection by the lane selection section 130 including the travel lane determination section 135. The lane selection section 130 repeatedly carries out processing illustrated in the flowchart at predetermined periods in a time period until a lane change is performed. First, in step S21, the lane selection section 130 acquires the surrounding object information and the traveling road information from the surrounding object recognition section 120 and the traveling road recognition section 110. In step S22, the lane selection section 130 calculates the vehicle density in the adjacent lane, the threshold density, the entry frequency, and the threshold frequency based on the surrounding object information and the traveling road information which are acquired in step S21 respectively.

In step S23, the lane selection section 130 compares the vehicle density and the threshold density which are calculated in step S22, and determines whether the vehicle density in the adjacent lane is lower than the threshold density. When the vehicle density in the adjacent lane is the threshold density or more, the lane selection section 130 selects to keep the present own vehicle travel lane in step S26.

When the vehicle density in the adjacent lane is lower than the threshold density, the lane selection section 130 subsequently performs determination in step S24. In step S24, the lane selection section 130 determines whether the entry frequency F1 with which the other vehicles enter into the own lane from the adjacent lane is lower than the threshold frequency F_THR1. When the entry frequency F1 is lower than the threshold frequency F_THR1, the lane selection section 130 selects change of the own vehicle travel lane to the adjacent lane in step S25. However, when the entry frequency F1 is the threshold frequency F_THR1 or more, the lane selection section 130 keeps determination not to select the adjacent lane as the own vehicle travel lane, and selects to keep the present own vehicle travel lane.

Lane selection that is performed in the process as above reduces making lane change to a lane that is empty for the reason that a construction section is ahead, an accident happens ahead or the like. Consequently, such a useless vehicle action that makes it necessary to perform lane change to the original lane again after lane change can be reduced. Consequently, according to the autonomous driving system according to the present embodiment, an occupant can be restrained from feeling a sense of discomfort. Further, according to the autonomous driving system according to the present embodiment, a disturbance in the traffic flow caused by performing useless lane change is restrained, and thereby, contribution can be made to realization of a smooth traffic flow.

Second Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment is in the calculation method of the threshold density by the threshold density calculation section 132 and the calculation method of the threshold frequency by the threshold frequency calculation section 134.

In the present embodiment, the threshold density calculation section 132 calculates the vehicle density in the own lane as the threshold density. As illustrated in FIG. 3, vehicles recognizable in the own vehicle travel lane L2 are only the preceding vehicle 201 and the following vehicle 202 in closest vicinities, and it is difficult to recognize the other vehicles because the other vehicles are in blind spots of the autonomous recognition sensors 10 to 13, 20 to 22 and 30 (refer to FIG. 1). Therefore, in the present embodiment, the vehicle density in the own lane is not obtained by a statistical method, but the vehicle density in the own lane is estimated from information correlated with the vehicle density.

The information correlated with the vehicle density refers to a relation between a standard traveling speed on the road where the vehicles are traveling, and an actual traveling speed of the vehicles. Specifically, when a situation where vehicles are traveling at the standard traveling speed, and a situation where the vehicles are traveling at a lower speed than the standard traveling speed are compared, a vehicle density in the latter situation tends to be higher than a vehicle density in the former situation. Further, when a road in which the standard traveling speed is high, and a road in which the standard traveling speed is low are compared, a vehicle density in the latter road tends to be higher than a vehicle density in the former road. Consequently, if the traveling speed of the vehicles traveling on the own lane and the standard traveling speed in the own lane are known, the vehicle density in the own lane can be estimated based on the traveling speed of the vehicle traveling on the own lane and the standard traveling speed in the own lane.

The threshold density calculation section 132 acquires a traveling speed of the preceding vehicle 201 which is contained in the recognition information of the surrounding objects, and acquires a regulation speed of the own lane L2 as the standard traveling speed from the map database 5 (refer to FIG. 2). The traveling speed of the preceding vehicle 201 is used as a representative value of traveling speeds of the vehicles traveling on the own lane. The threshold density calculation section 132 searches for a table illustrated in FIG. 10 with the traveling speed of the preceding vehicle 201 and the standard traveling speed as arguments respectively. According to the table, a representative value of the standard vehicle density is obtained from the standard traveling speed. Further, according to the table, from the standard traveling speed and the traveling speed of the preceding vehicle, a coefficient by which the representative value of the standard vehicle density is multiplied is obtained. Subsequently, a value obtained by multiplying the representative value of the standard vehicle density by the coefficient is calculated as the vehicle density in the own lane. Note that as the representative value of the standard vehicle density, a fixed value that is obtained by performing an actual survey with respect to the relation between the traveling speed and the vehicle density may be used, for example. Alternatively, a time-series average value of the vehicle density in the adjacent lane L1 may be used as the representative value of the standard vehicle density in the own lane L2.

FIG. 11 is a graph expressing relationship among parameters specified in the table illustrated in FIG. 10. As illustrated in the graph, as a difference between the standard traveling speed of the own lane and the traveling speed of the preceding vehicle of the own lane is larger, the vehicle density of the own lane, which is calculated by the threshold density calculation section 132 becomes larger. Further, as the standard traveling speed of the own lane is lower, the vehicle density in the own lane, which is calculated by the threshold density calculation section 132 becomes larger. Note that in the present embodiment, the vehicle density in the own lane is calculated by using the table illustrated in FIG. 10, but the relationship among the parameters shown in the graph illustrated in FIG. 11 is specified by a function, and the vehicle density in the own lane, that is, the threshold density may be calculated by using the function.

In the present embodiment, the threshold frequency calculation section 134 calculates the comparison parameter P1 based on a difference between the vehicle density in the adjacent lane and the vehicle density in the own lane. The difference in the vehicle density between the lanes expresses a difference between a congestion state in the adjacent lane and a congestion state in of the own lane. When there is a difference in the congestion state between the adjacent lanes, the vehicles naturally move to an empty lane from the congested lane. That is, when the vehicle density in the adjacent lane is higher than the vehicle density in the own lane, lane change to the own lane from the adjacent lane is encouraged. Conversely, when the vehicle density in the own lane is higher than the vehicle density in the adjacent lane, lane change to the adjacent lane from the own lane is encouraged. Therefore, the threshold frequency calculation section 134 increases the value of the comparison parameter P1 when the difference in the vehicle density between the lanes is positive, and decreases the value of the comparison parameter P1 when the difference in the vehicle density between the lanes is negative. Specifically, a value obtained by multiplying the difference in the vehicle density between the lanes by a positive coefficient is calculated as the comparison parameter P1. In the present embodiment, the threshold frequency calculation section 134 calculates the threshold frequency F_THR1 based on the comparison parameter P1 calculated based on the difference in the vehicle density between the lanes, and the exit frequency F2 calculated by the method in the first embodiment. Note that as for the vehicle density in the adjacent lane that is used in calculation of the comparison parameter P1, what is calculated in the adjacent lane vehicle density calculation section 131 may be used. As for the vehicle density in the own lane which is used in calculation of the comparison parameter P1, what is calculated in the threshold density calculation section 132 may be used.

According to the autonomous driving system according to the present embodiment, whether to make lane change to the adjacent lane is determined with the congestion state in the own lane also taken into consideration, in addition to the vehicle density in the adjacent lane. Consequently, an effect of lane change of the own vehicle dispersing a traffic flow, and an effect of suppressing a disturbance in the traffic flow by reducing useless lane change can be enhanced.

Third Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the method for recognizing surrounding objects by the surrounding object recognition section 120.

In the present embodiment, the surrounding object recognition section 120 acquires the road traffic information received by the road-vehicle communication device 40. In the infrastructure equipment such as a road traffic information system with which the road-vehicle communication device 40 communicates, positional information of vehicles traveling on the road is collected and is transmitted as road traffic information. Therefore, the road traffic information which is acquired by the surrounding object recognition section 120 includes at least rough positional information of other vehicles on the road where the own vehicle is traveling. That is, in the present embodiment, recognition of the surrounding objects is performed on the side of the infrastructure equipment, and the surrounding object recognition section 120 receives the recognition information and outputs the recognition information to the lane selection section 130.

Specifically, the surrounding object recognition section 120 classifies the positional information of other vehicles which is the recognition information into positional information of other vehicles traveling on the own lane, and positional information of other vehicles traveling on the adjacent lane. The surrounding object recognition section 120 outputs the positional information of the other vehicles traveling on the adjacent lane to the adjacent lane vehicle density calculation section 131, the entry frequency calculation section 133 and the threshold frequency calculation section 134. Further, the surrounding object recognition section 120 outputs the positional information of the other vehicles traveling on the own lane to the threshold density calculation section 132, the entry frequency calculation section 133 and the threshold frequency calculation section 134.

The adjacent lane vehicle density calculation section 131 calculates the vehicle density in the adjacent lane based on the positional information of the other vehicles traveling on the adjacent lane. The threshold density calculation section 132 calculates the vehicle density in the own lane as the threshold density based on the positional information of the other vehicles traveling on the own lane. The method for calculating the vehicle density from the positional information of three vehicles or more is as described in the first embodiment. In the present embodiment, to the calculation method of the vehicle density in the own lane, the calculation method of the vehicle density in the adjacent lane described in the first embodiment is applied.

The entry frequency calculation section 133 calculates the entry frequency with which other vehicles enter into the own lane from the adjacent lane based on the positional information of the other vehicles traveling on the adjacent lane and the positional information of the other vehicles traveling on the own lane. For example, in regard with a predetermined region which is set with the position of the own vehicle as a reference, a total number of other vehicles traveling on the adjacent lane, and a total number of other vehicles traveling on the own lane are respectively calculated, and a number of other vehicles that enter into the own lane from the adjacent lane may be calculated based on increase and decrease of these vehicles, and an entry frequency into the own lane from the adjacent lane may be calculated based on the number of the other vehicles entering into the own lane from the adjacent lane.

The threshold frequency calculation section 134 calculates a comparison parameter based on a difference between the vehicle density in the adjacent lane calculated in the adjacent lane vehicle density calculation section 131, and the vehicle density in the own lane calculated in the threshold density calculation section 132. Further, the threshold frequency calculation section 134 calculates an exit frequency with which other vehicles exit from the own lane to the adjacent lane based on the positional information of the other vehicles traveling on the adjacent lane and the positional information of the other vehicles traveling on the own lane. For example, in regard with a predetermined region which is set with the position of the own vehicle as a reference, the total number of other vehicles traveling on the adjacent lane, and the total number of other vehicles traveling on the own lane are respectively calculated, and a number of other vehicles that exit to the adjacent lane from the own lane may be calculated based on increase and decrease of these vehicles, and an exit frequency to the adjacent lane from the own lane may be calculated based on the number of the other vehicles exiting to the adjacent lane from the own lane. The threshold frequency calculation section 134 calculates the threshold frequency based on the comparison parameter and the exit frequency which are calculated in this way.

According to the autonomous driving system according to the present embodiment, the information concerning the vehicle density in the adjacent lane, the information concerning the vehicle density in the own lane, the information concerning the entry frequency to the own lane from the adjacent lane, and the information concerning the exist frequency to the adjacent lane from the own lane can be acquired without using the autonomous recognition sensors. Therefore, according to the autonomous driving system according to the present embodiment, even under the situation where the autonomous recognition sensors do no function effectively, traveling of the own vehicle can be controlled so as to eliminate an imbalance in the traffic flow in each of the lanes, and so as not to perform useless lane change. Note that the method for recognizing surrounding objects according to the present embodiment may be used in combination with the method for recognizing surrounding objects using the autonomous recognition sensors.

Fourth Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the method for recognizing surrounding objects by the surrounding object recognition section 120. Further, calculation methods in the respective sections that are the adjacent lane vehicle density calculation section 131, the threshold density calculation section 132, the entry frequency calculation section 133 and the threshold frequency calculation section 134 differ from the calculation methods in the autonomous driving system according to the first embodiment.

In the present embodiment, recognition information obtained by the autonomous recognition sensors in the respective vehicles, and recognition information obtained by recognition devices installed on roads are collected by a server on the Internet. The server processes the collected information, and calculates a vehicle density in each lane in each road. Further, calculation of a frequency of movement of vehicles among lanes is also performed in the server. Under the precondition like this, the mobile communication device 41 transmits information concerning the road on which the own vehicle is traveling to the server, and receives the vehicle density in each of the lanes of the road on which the own vehicle is traveling and the frequency of movement of the vehicles among lanes from the server.

The surrounding object recognition section 120 classifies the vehicle density in each of the lanes which is received by the mobile communication device 41 into the vehicle density in the adjacent lane and the vehicle density in the own lane. The surrounding object recognition section 120 outputs the vehicle density in the adjacent lane to the adjacent lane vehicle density calculation section 131 and the threshold frequency calculation section 134, and outputs the vehicle density in the own lane to the threshold density calculation section 132 and the threshold frequency calculation section 134. Further, the surrounding object recognition section 120 classifies the frequencies of movement of the vehicles between the lanes that are received by the mobile communication device 41 into the entry frequency into the own lane from the adjacent lane, and the exit frequency to the adjacent lane from the own lane. The surrounding object recognition section 120 outputs the entry frequency to the own lane from the adjacent lane to the entry frequency calculation section 133, and outputs the exit frequency to the adjacent lane from the own lane to the threshold frequency calculation section 134.

The adjacent lane vehicle density calculation section 131 directly outputs the vehicle density in the adjacent lane that is inputted from the surrounding object recognition section 120 to the travel lane determination section 135. The threshold density calculation section 132 directly outputs the vehicle density in the own lane that is inputted from the surrounding object recognition section 120 to the travel lane determination section 135 as the threshold density. The entry frequency calculation section 133 directly outputs the entry frequency which is inputted from the surrounding object recognition section 120 to the travel lane determination section 135. That is, in the present embodiment, calculation of the vehicle density in each of the lanes and calculation of the frequency of movement of the vehicles between the lanes are performed in the server in advance, and therefore the surrounding object recognition section 120, the adjacent lane vehicle density calculation section 131, the threshold density calculation section 132 and the entry frequency calculation section 133 can transmit calculation results by the server that are received by the mobile communication device 41 directly to a downstream side.

The threshold frequency calculation section 134 calculates a comparison parameter based on the vehicle density in the adjacent lane and the vehicle density in the own lane which are inputted from the surrounding object recognition section 120. The threshold frequency calculation section 134 calculates the threshold frequency based on the comparison parameter which is calculated, and the exit frequency which is inputted from the surrounding object recognition section 120, and outputs the calculated threshold frequency to the travel lane determination section 135. That is, in the present embodiment, only calculation of the threshold frequency out of the information necessary to determine the travel lane is performed in the lane selection section 130.

According to the autonomous driving system according to the present embodiment, the vehicle density in the adjacent lane, the vehicle density in the own lane, the entry frequency to the own lane from the adjacent lane, and the exit frequency to the adjacent lane from the own lane can be respectively acquired without using the autonomous recognition sensors. Therefore, according to the autonomous driving system according to the present embodiment, even under the situation where the autonomous recognition sensors do not function effectively, traveling of the own vehicle can be controlled so as to eliminate an imbalance in the traffic flow in each of the lanes, and so as not to perform useless lane change. Note that the method for recognizing surrounding objects according to the present embodiment may be used in combination with the method for recognizing surrounding objects using the autonomous recognition sensors.

Fifth Embodiment

An autonomous driving system according to the present embodiment has the configuration illustrated in FIG. 2 as in the autonomous driving system according to the first embodiment, and is mounted on the autonomous driving vehicle illustrated in FIG. 1. A difference between the autonomous driving system according to the present embodiment and the autonomous driving system according to the first embodiment lies in the function of the lane change proposition section 142.

In the first embodiment, even when the adjacent lane is empty, if the entry frequency with which other vehicles enter into the own lane from the adjacent lane is high, determination not to select the adjacent lane as the own vehicle travel lane is kept under the estimation that a traveling hindrance factor is present ahead on the adjacent lane. However, there is a possibility of the factor having nothing to do with the own vehicle in reality. For example, there is a case in which when the own vehicle is traveling on a lane at an outlet side of an interchange in a motorway, vehicles going to the outlet of the interchange simultaneously enter into the own lane from the adjacent lane. In the case like this, the reason why the adjacent lane is empty has nothing to do with the own vehicle, and the own vehicle will be caught in a traffic jam unless lane change to the adjacent lane is performed.

Therefore, in the present embodiment, determination of whether or not to perform lane change to the adjacent lane is entrusted to the driver when it is estimated that a traveling hindrance factor is present ahead on the adjacent lane, although the empty space situation of the adjacent lane satisfies the selection reference for selecting the adjacent lane as the own vehicle travel lane. The driver himself or herself performs final judgment, whereby the occupants are restrained from feeling a sense of comfort to a result of performing lane change or a result of not performing lane change. As a method for entrusting the determination of whether to perform lane change to the driver, proposal by the lane change proposition section 142 is used in the present embodiment.

Specifically, when it is determined that the entry frequency is the threshold frequency or more while the vehicle density in the adjacent lane is lower than the threshold value by the lane selection section 130, the lane change proposition section 142 informs the driver that the adjacent lane is emptier and thereafter proposes lane change to the adjacent lane to the driver. At this time, presence of a certain traveling hindrance factor ahead on the adjacent lane may be reported together. The proposal by the lane change proposition section 142 is performed by sound (for example, a voice) or light (an image, for example) via the HMI 7.

Figure 12:
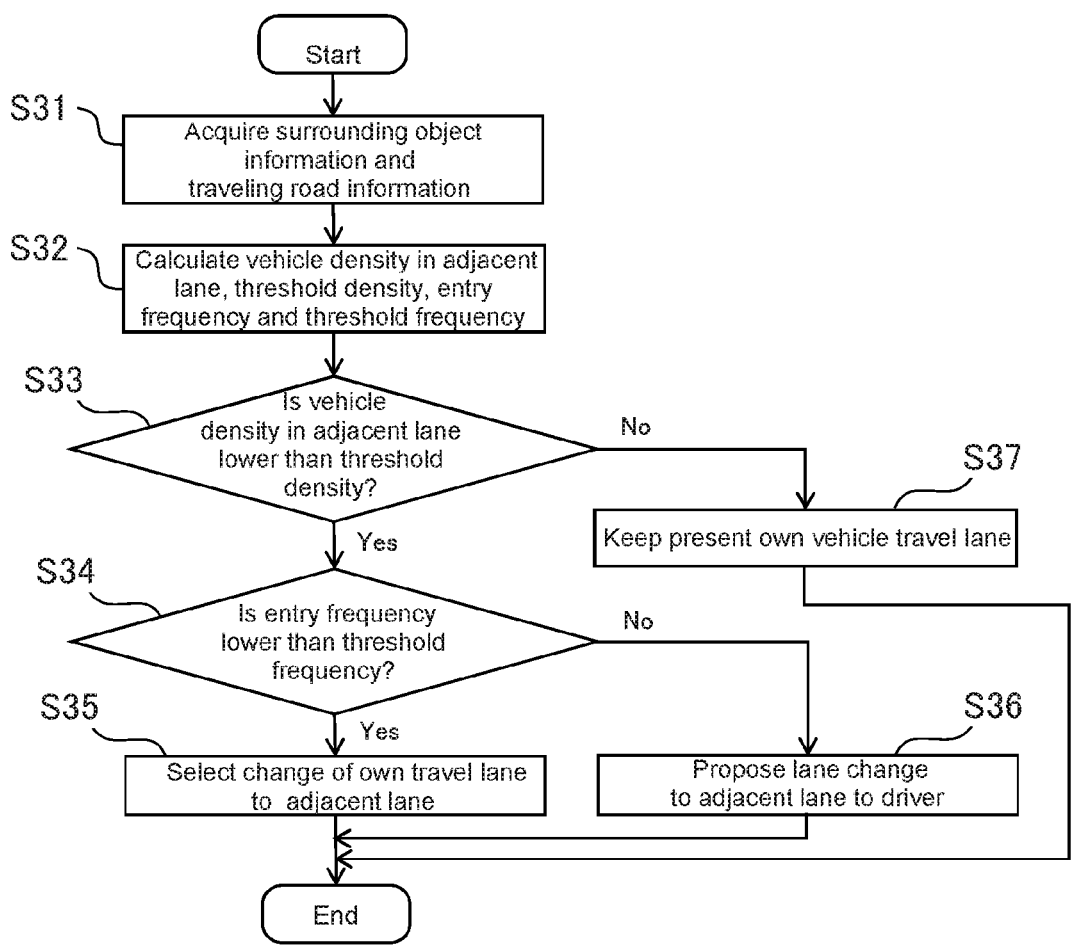
FIG. 12 is a flowchart illustrating a flow of lane change control according to a fifth embodiment.

Here, FIG. 12 is a flowchart illustrating a flow of lane change control according to the present embodiment. The control device 100 repeatedly carries out processing illustrated in the flowchart at predetermined periods in a period until lane change is performed. First in step S31, the lane selection section 130 acquires the surrounding object information and the traveling road information respectively from the surrounding object recognition section 120 and the traveling road recognition section 110. In step S32, the lane selection section 130 calculates the vehicle density in the adjacent lane, the threshold density, the entry frequency and the threshold frequency respectively based on the surrounding object information and the traveling road information which are acquired in step S31. As for methods for acquiring respective kinds of information, and calculation methods of the respective parameters, any methods in the first to fourth embodiments may be used.

In step S33, the lane selection section 130 performs first determination processing of comparing the vehicle density in the adjacent lane and the threshold density, and determining whether the vehicle density in the adjacent lane is lower than the threshold density. When the vehicle density in the adjacent lane is the threshold density or more, the control section 140 controls traveling of the own vehicle so as to keep the present own vehicle travel lane in step S37.

When the vehicle density in the adjacent lane is lower than the threshold density, the lane selection section 130 subsequently performs determination in step S34. In step S34, the lane selection section 130 performs second determination processing of determining whether the entry frequency with which the other vehicles enter into the own lane from the adjacent lane is lower than the threshold frequency. When the entry frequency is lower than the threshold frequency, processing in step S35 is selected. In step S35, the lane selection section 130 selects the adjacent lane as the own vehicle travel lane as third determination processing, and the control section 140 controls traveling of the own vehicle to perform lane change to the adjacent lane autonomously.

When the entry frequency is the threshold frequency of more, processing in step S36 is selected. In step S36, the lane change proposition section 142 in the control section 140 proposes lane change to the adjacent lane to the driver. When the driver agrees to the proposal of the lane change proposition section 142, the control section 140 performs lane change to the adjacent lane autonomously, and when the driver does not agree to the proposal, the control section 140 keeps the present own vehicle travel lane.

Sixth Embodiment

Figure 13:
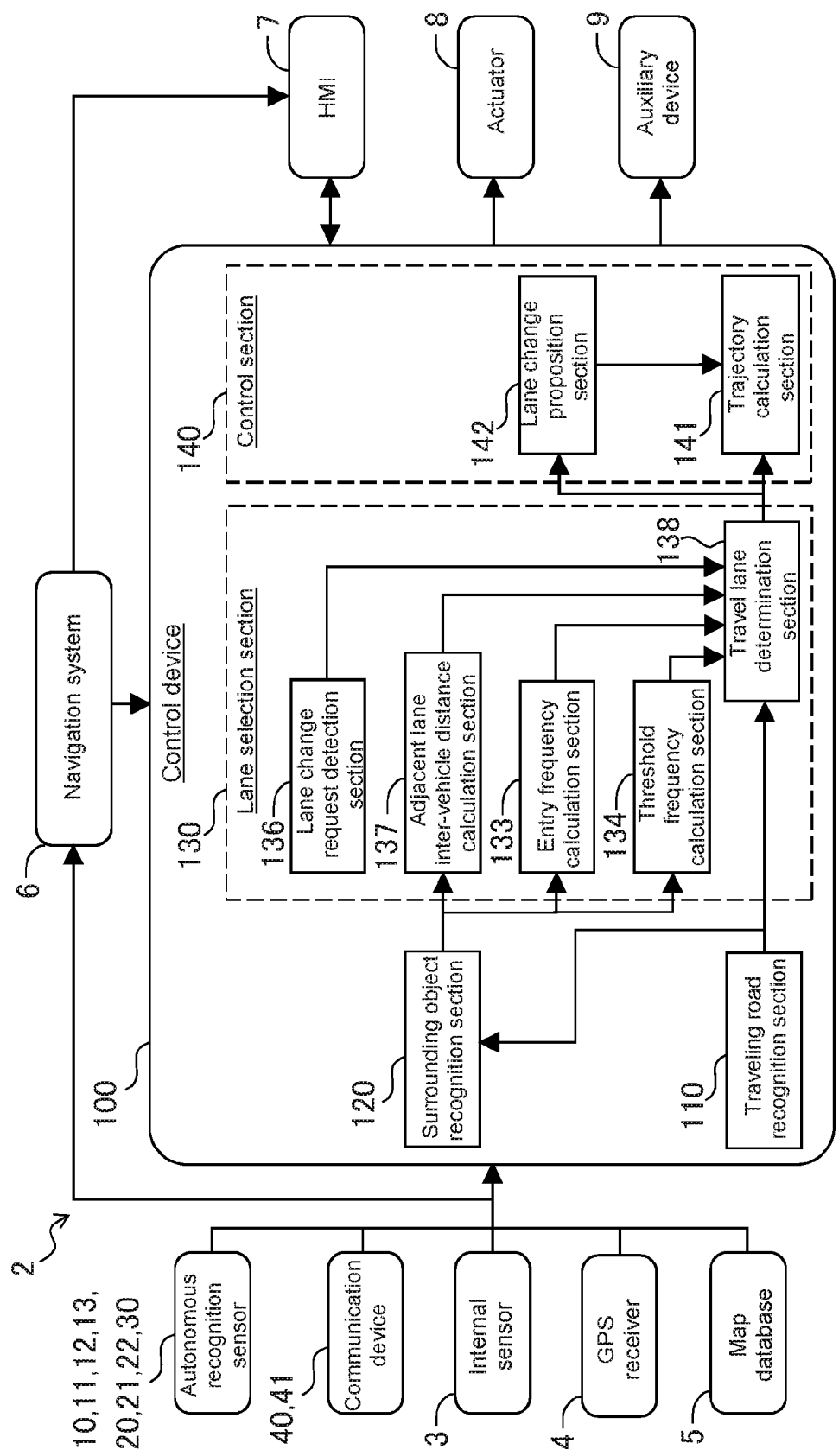
FIG. 13 is a block diagram illustrating a configuration of an autonomous driving system according to a sixth embodiment.

An autonomous driving system according to the present embodiment is mounted on the autonomous driving vehicles illustrated in FIG. 1, as in the autonomous driving system according to the first embodiment. However, a configuration of the autonomous driving system of the present embodiment differs from the configuration of the autonomous driving system according to the first embodiment. FIG. 13 is a block diagram illustrating a configuration of an autonomous driving system according to the present embodiment. In FIG. 13, functions relating to lane change of an own vehicle are specially expressed in blocks, among functions for autonomous driving which the control device 100 according to the present embodiment has. Note that in FIG. 13, as for functions common to the functions of the control device 100 according to the first embodiment, common reference signs are used.

The autonomous driving system according to the present embodiment has a function of performing lane change autonomously when the autonomous driving system detects an empty space to which lane change can be made in the adjacent lane in a case in which a request for lane change to the adjacent lane is present. The request for lane change includes a request from the driver, and a request that is generated inside the autonomous driving system. However, even when the empty space to which lane change can be made is present in the adjacent lane, if the entry frequency of other vehicles to the own lane from the adjacent lane is high, determination not to select the adjacent lane as the own vehicle travel lane is kept. In order to realize the function like this, the lane selection section 130 in the control device 100 according to the present embodiment includes a lane change request detection section 136, an adjacent lane inter-vehicle distance calculation section 137, the entry frequency calculation section 133, the threshold frequency calculation section 134 and a travel lane determination section 138. Note that the functions of the entry frequency calculation section 133 and the threshold frequency calculation section 134 are as described in the first to fifth embodiments.

The lane change request detection section 136 detects a request for lane change that is inputted by a driver operating the HMI 7. Further, the lane change request detection section 136 detects a request for lane change based on a travel lane plan that is planned inside the autonomous driving system. When the request for lane change is detected, the lane change request detection section 136 outputs a signal notifying that the request for lane change is present, to the travel lane determination section 138.

The adjacent lane inter-vehicle distance calculation section 137 acquires the recognition information of surrounding objects that is inputted to the lane selection section 130 from the surrounding object recognition section 120. The recognition information of surrounding objects includes positions and speeds of other vehicles traveling on the adjacent lane. The adjacent lane inter-vehicle distance calculation section 137 calculates an inter-vehicle distance between each of the vehicles traveling on the adjacent lane, and a vehicle ahead of each of the vehicles based on the positions and speeds of other vehicles traveling on the adjacent lane. The inter-vehicle distance in the adjacent lane is one of parameters indicating the empty space situation in the adjacent lane.

In the example illustrated in FIG. 3, the inter-vehicle distance between the vehicle 211 and the vehicle 212, the inter-vehicle distance between the vehicle 212 and the vehicle 213 and the inter-vehicle distance between the vehicle 213 and the vehicle 214 are respectively calculated. However, when the traveling speed of the other vehicles traveling on the adjacent lane is lower than the traveling speed of the own vehicle, only the inter-vehicle distance of the other vehicle traveling ahead of the own vehicle (the inter-vehicle distance between the vehicle 211 and the vehicle 212 in the example illustrated in FIG. 3) may be calculated. When the traveling speed of the other vehicles traveling on the adjacent lane is higher than the traveling speed of the own vehicle, only the inter-vehicle distance of the other vehicle traveling behind the own vehicle (the inter-vehicle distance between the vehicle 213 and the vehicle 214 in the example illustrated in FIG. 3) may be calculated. The adjacent lane vehicle density calculation section 131 updates calculation values of the inter-vehicle distances of the respective vehicles traveling on the adjacent lane at periods set in advance.

When the travel lane determination section 138 is notified that the request for lane change is present by the lane change request detection section 136, the travel lane determination section 138 compares the inter-vehicle distances of the respective vehicles that are calculated in the adjacent lane inter-vehicle distance calculation section 137 with a threshold distance. The threshold distance is an inter-vehicle distance into which the own vehicle can move safely, and is a selection reference for determining whether to select the adjacent lane as the own vehicle travel lane. The threshold distance may be set at a fixed value, or may be expressed by a function with a relative speed of the other vehicles traveling on the adjacent lane to the own vehicle as a variable.

When the inter-vehicle distance in the adjacent lane is larger than the threshold distance, lane change is performed in such a way as to move into between the vehicle and the vehicle which give the inter-vehicle distance, whereby lane change to the adjacent lane can be achieved safely. However, when the inter-vehicle distance in the adjacent lane is long because a traveling hindrance factor is present ahead on the adjacent lane, if lane change is made to the adjacent lane, return to the original lane has to be made immediately. Lane change in this case is a totally useless action to the own vehicle. Further, not only the action is useless, but the action generates a disturbance in the traffic flow, and hinders realization of a smooth traffic flow.

Therefore, the travel lane determination section 138 selects to change the own vehicle travel lane to the adjacent lane only when the entry frequency with which other vehicles enter into the own lane from the adjacent lane is lower than the threshold frequency, when the inter-vehicle distance in the adjacent lane is longer than the threshold distance. When the inter-vehicle distance in the adjacent lane is the threshold distance or less, and when the entry frequency is the threshold frequency or more even though the inter-vehicle distance in the adjacent lane is larger than the threshold distance, the travel lane determination section 138 keeps determination not to select the adjacent lane as the autonomous vehicle travel lane.

Figure 14:
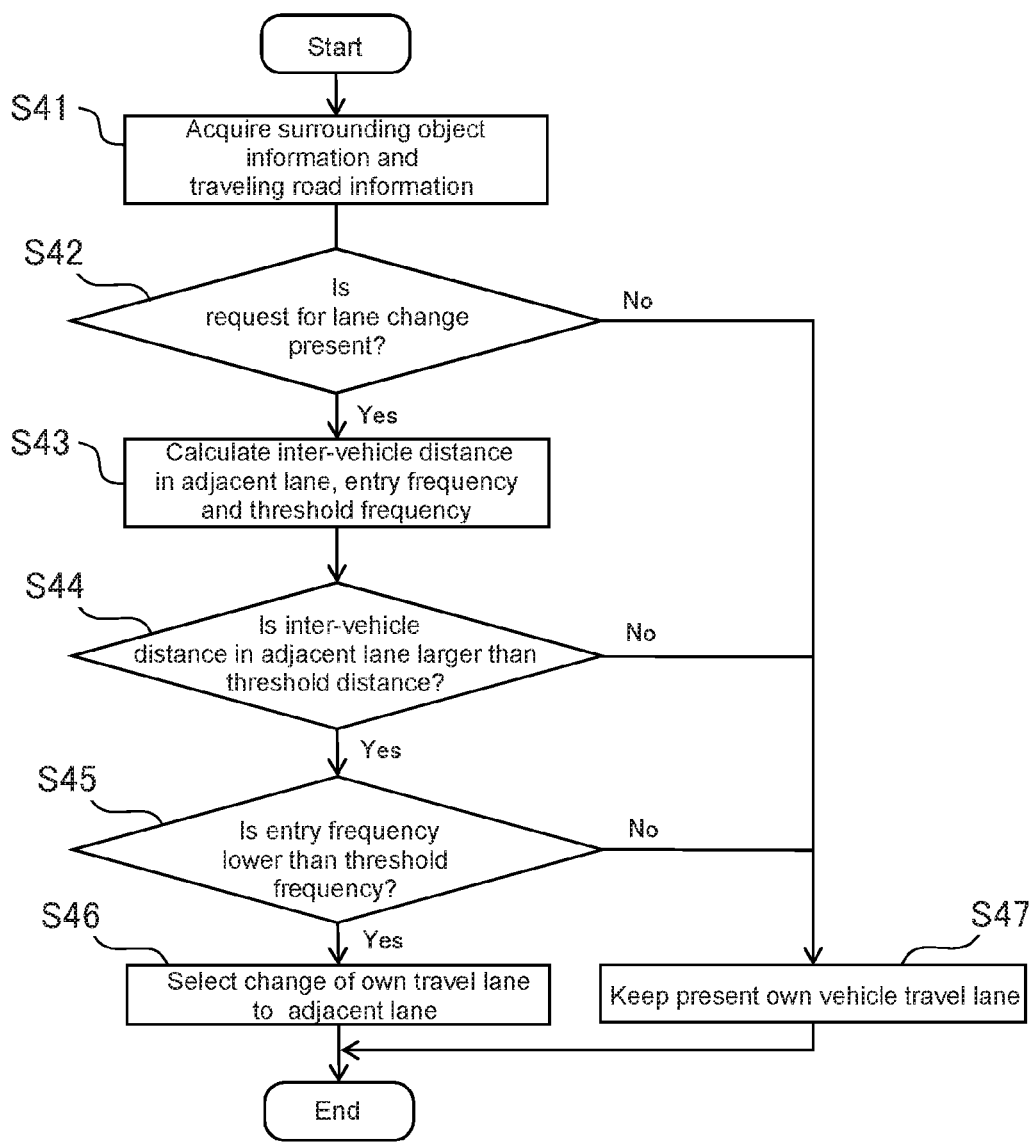
FIG. 14 is a flowchart illustrating a flow of lane selection according to the sixth embodiment.

Here, FIG. 14 is a flowchart illustrating a flow of lane selection by the lane selection section 130 including the travel lane determination section 138. The lane selection section 130 repeatedly carries out processing illustrated in the flowchart at predetermined periods in a time period until lane change is performed. First, in step S41, the lane selection section 130 acquires the surrounding object information and the travel road information respectively from the surrounding object recognition section 120 and the traveling road recognition section 110.

First, in step S42, the lane selection section 130 determines whether a request for lane change is present. When the request for lane change is not present, the lane selection section 130 selects to keep the present own vehicle travel lane in step S47.

When the request for lane change is present, the lane selection section 130 performs processing in step S43. In step S43, the lane selection section 130 calculates the inter-vehicle distance in the adjacent lane, the entry frequency and the threshold frequency respectively based on the surrounding object information and the traveling road information which are acquired in step S41. Note that the inter-vehicle distance in the adjacent lane is the inter-vehicle distance between the vehicle and the vehicle into which the own vehicle moves at the time of lane change to the adjacent lane.

In step S44, the lane selection section 130 compares the inter-vehicle distance in the adjacent lane, which is calculated in step S43, and the threshold distance, and determines whether the inter-vehicle distance in the adjacent lane is longer than the threshold distance. When the inter-vehicle distance in the adjacent lane is the threshold distance or less, the lane selection section 130 selects to keep the present own vehicle travel lane in step S47.

When the inter-vehicle distance in the adjacent lane is longer than the threshold distance, the lane selection section 130 subsequently performs determination in step S45. In step S45, the lane selection section 130 determines whether the entry frequency with which other vehicles enter into the own lane from the adjacent lane is lower than the threshold frequency. When the entry frequency is lower than the threshold frequency, the lane selection section 130 selects change of the own vehicle travel lane to the adjacent lane in step S46. However, when the entry frequency is the threshold frequency or more, the lane selection section 130 keeps determination not to select the adjacent lane as the own vehicle travel lane in step S47, and selects to keep the present own vehicle travel lane.

Lane election is performed in this way, and thereby a useless vehicle action that performs lane change in response to a request for lane change and thereafter has to perform lane change to the original lane again can be reduced. Consequently, according to the autonomous driving system according to the present embodiment, an occupant can be restrained from feeling a sense of discomfort, and contribution can be made to realization of a smooth traffic flow by suppressing a disturbance in a traffic flow as a result of useless lane change being performed.

Other Embodiments

The vehicle density in the own lane may be calculated as follows when the threshold density is calculated based on the vehicle density in the own lane. First, when the own vehicle is traveling on a certain lane, the vehicle density in the adjacent lane is calculated by the method described in the first embodiment, for example. The vehicle density in the adjacent lane is stored in the memory, and is updated at predetermined periods. When change to the adjacent lane is performed, the vehicle density in the adjacent lane which is stored in the memory at the point of time is read, and is stored in another region in the memory as the vehicle density in the own lane. The vehicle density in the own lane which is stored is held until lane change is performed again.

In each of the aforementioned embodiments, explanation is made by citing the example of the case where the own vehicle is traveling on the road in which the number of lanes is two, but the number of lanes of the road on which the own vehicle is traveling may be three or more. However, in the case of the number of lanes being three or more, lanes to which lane change can be made are present at both sides of the own lane, and therefore a scene can arise, in which either one of lane change to a right adjacent lane and lane change to a left adjacent lane has to be selected. In that case, the entry frequencies of other vehicles are calculated for both the adjacent lanes, and the lane with a lower entry frequency than the threshold frequency may be selected. When both the entry frequency from the right adjacent lane and the entry frequency from the left adjacent lane are lower than the threshold frequency, the lane with a lower entry frequency may be selected.

What is claimed is:

1. An autonomous driving system mounted on a vehicle, comprising:
 a control device comprising:
 one or more CPUs;
 one or more memories; and
 one or more programs stored in the one or more memories that, when executed by the one or more CPUs, cause the control device to:
 acquire information concerning an empty space situation of an adjacent lane that is adjacent to a lane on which an own vehicle is traveling, and information concerning an entry frequency with which other vehicles enter into the lane on which the own vehicle is traveling from the adjacent lane, when the own vehicle travels on a road having a plurality of lanes;
 determine whether or not to select the adjacent lane as an own vehicle travel lane in accordance with the empty space situation of the adjacent lane and the entry frequency;
 perform lane change to the adjacent lane autonomously, or propose lane change to the adjacent lane to a driver, when the adjacent lane is selected as the own vehicle travel lane; and
 keep the adjacent lane from being selected as the own vehicle travel lane, irrespective of the empty space situation in the adjacent lane, when the entry frequency is a threshold frequency or more.

2. The autonomous driving system according to claim 1, wherein the one or more programs stored in the one or more memories, when executed by the one or more CPUs, cause the control device to determine the threshold frequency in accordance with at least a difference between a flow state in the adjacent lane and a flow state in the lane on which the own vehicle is traveling.

3. The autonomous driving system according to claim 1, wherein the one or more programs stored in the one or more memories, when executed by the one or more CPUs, cause the control device to determine the threshold frequency in accordance with at least a difference between a congestion state in the adjacent lane and a congestion state in the lane on which the own vehicle is traveling.

4. The autonomous driving system according to claim 1, wherein the one or more programs stored in the one or more memories, when executed by the one or more CPUs, cause the control device to determine the threshold frequency in accordance with at least an exit frequency with which other vehicles exit to the adjacent lane from the lane on which the own vehicle is traveling.

5. The autonomous driving system according to claim 1, wherein the one or more programs stored in the one or more memories, when executed by the one or more CPUs, cause the control device to:
 perform first determination processing of determining whether or not the empty space situation in the adjacent lane satisfies a selection reference for selecting the adjacent lane as the own vehicle travel lane, second determination processing of determining whether or not the entry frequency is smaller than the threshold frequency, and third determination processing of selecting the adjacent lane as the own vehicle travel lane on condition that the empty space situation in the adjacent lane satisfies the selection reference, and the entry frequency is smaller than the threshold frequency, and propose lane change to the adjacent lane to a driver when the adjacent lane is not selected as the own vehicle travel lane in response to the entry frequency being the threshold frequency or more and the empty space situation in the adjacent lane satisfying the selection reference.

* * * * *

UNITED STATES PATENT AND TRADEMARK OFFICE
CERTIFICATE OF CORRECTION

PATENT NO. : 10,343,686 B2
APPLICATION NO. : 15/667055
DATED : July 9, 2019
INVENTOR(S) : Ryuta Hashimoto et al.

Page 1 of 1

It is certified that error appears in the above-identified patent and that said Letters Patent is hereby corrected as shown below:

In the Specification

In Column 4, Line 37, delete "of the of the" and insert --of the--, therefor.

In Column 10, Line 5, delete "oval" and insert --own--, therefor.

Signed and Sealed this
Twenty-seventh Day of August, 2019

Andrei Iancu
*Director of the United States Patent and Trademark Office*